United States Patent
Fujii

(10) Patent No.: US 9,204,209 B2
(45) Date of Patent: Dec. 1, 2015

(54) OPTICAL TRANSMISSION APPARATUS

(71) Applicant: FUJITSU LIMITED, Kawasaki-shi (JP)

(72) Inventor: Yasuki Fujii, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 84 days.

(21) Appl. No.: 13/790,784

(22) Filed: Mar. 8, 2013

(65) Prior Publication Data

US 2013/0259473 A1 Oct. 3, 2013

(30) Foreign Application Priority Data

Mar. 30, 2012 (JP) .................................. 2012-082252

(51) Int. Cl.
| | |
|---|---|
| H04B 10/20 | (2006.01) |
| H04B 10/08 | (2006.01) |
| H04J 14/02 | (2006.01) |
| H04Q 11/00 | (2006.01) |
| H04J 3/08 | (2006.01) |

(52) U.S. Cl.
CPC ............ *H04Q 11/0005* (2013.01); *H04J 3/085* (2013.01); *H04J 14/02* (2013.01); *H04J 14/0257* (2013.01); *H04J 14/0258* (2013.01); *H04J 14/0268* (2013.01); *H04J 14/0269* (2013.01); *H04J 14/0283* (2013.01); *H04J 14/0291* (2013.01); *H04J 14/0295* (2013.01); *H04J 2203/006* (2013.01); *H04J 2203/0042* (2013.01); *H04J 2203/0053* (2013.01)

(58) Field of Classification Search
CPC .............. H04J 14/0268; H04J 14/0269; H04J 14/0283
USPC ................................................ 398/43, 45, 48
See application file for complete search history.

(56) References Cited

U.S. PATENT DOCUMENTS

| | | | | |
|---|---|---|---|---|
| 6,144,633 | A * | 11/2000 | Ikeda et al. | 370/217 |
| 6,625,115 | B1 * | 9/2003 | Ikeda et al. | 370/217 |
| 6,643,041 | B1 * | 11/2003 | Ikeda et al. | 398/79 |
| 7,586,929 | B2 * | 9/2009 | Mizutani et al. | 370/422 |

(Continued)

FOREIGN PATENT DOCUMENTS

| | | |
|---|---|---|
| JP | 08-125636 | 5/1996 |
| JP | 10-117175 | 5/1998 |

(Continued)

OTHER PUBLICATIONS

JPOA—Office Action mailed Sep. 1, 2015 for corresponding Japanese Application No. 2012-082252, with English translation of relevant part: p. 1 line 22 to 30 and p. 2 line 24 to 26.

*Primary Examiner* — Oommen Jacob
(74) *Attorney, Agent, or Firm* — Fujitsu Patent Center

(57) ABSTRACT

In an optical transmission apparatus, a path information table stores paths set in a network and wavelength channel information on the paths. A controller searches for an apparatus which performs route switching of paths using a plurality of grouped wavelength channels, based on fault information on the network detected by the optical transmission apparatus, fault information on the network detected by other optical transmission apparatus, and the paths and wavelength channel information on the paths stored in the path information table. When determining that the number of operating paths is maximized by performing the route switching of the paths in the optical transmission apparatus, the controller performs the route switching of the paths.

12 Claims, 39 Drawing Sheets

(56) References Cited

U.S. PATENT DOCUMENTS

| | | | |
|---|---|---|---|
| 8,280,244 B2 * | 10/2012 | Sugawara | 398/4 |
| 2002/0093703 A1 * | 7/2002 | Maeno | 359/110 |
| 2007/0065146 A1 * | 3/2007 | Hecker et al. | 398/4 |
| 2007/0212067 A1 * | 9/2007 | Miyazaki et al. | 398/57 |
| 2010/0209106 A1 * | 8/2010 | Sugawara | 398/59 |
| 2013/0259473 A1 * | 10/2013 | Fujii | 398/48 |

FOREIGN PATENT DOCUMENTS

| | | |
|---|---|---|
| JP | 2000-209152 | 7/2000 |
| JP | 2003-224587 | 8/2003 |

* cited by examiner

FRAME #x

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| Bridge Request Code | | | | Dest ID | | | | Src ID | | | | L/S | Status | | | | | | | | | | | | | | | | | | |

↑ $\lambda$ m SF FAULT         ↑ $\lambda$ m+15 SF FAULT

FRAME #x+1

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |

↑ $\lambda$ m+16 SF FAULT         ↑ $\lambda$ m+16 SF FAULT

FRAME #x+y

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |

↑ $\lambda$ m+n SF FAULT

FIG. 7

32 PATH INFORMATION TABLE

| PATH | ROUTE | ASSIGNED WAVELENGTH CHANNEL |
|---|---|---|
| PATH 1 | B-C-D | $\lambda 1$ |
| PATH 2 | C-D-E | $\lambda 2$ |
| PATH 3 | E-F | $\lambda 1$ |
|  |  |  |

FIG. 8

61 PATH INFORMATION TABLE

| PATH | ROUTE | ASSIGNED WAVELENGTH CHANNEL | PRIORITY |
|---|---|---|---|
| PATH 1 | B-C-D | λ1 | 3 |
| PATH 2 | C-D-E | λ2 | 2 |
| PATH 3 | E-F | λ1 | 5 |
|  |  |  |  |

FIG. 36

OPTICAL TRANSMISSION APPARATUS

CROSS-REFERENCE TO RELATED APPLICATIONS

This application is based upon and claims the benefit of priority of the prior Japanese Patent Application No. 2012-082252, filed on Mar. 30, 2012, the entire contents of which are incorporated herein by reference.

FIELD

The embodiments discussed herein are related to an optical transmission apparatus.

BACKGROUND

Recently, wavelength division multiplexing networks using an OTN (Optical Transport Network, ITU-T.G709) technology have been put to practical use in order to increase the capacity of networks. In such networks, a protection scheme for fast fault recovery is needed for occurrence of a fault.

For ring networks in which wavelengths are not multiplexed as in a conventional Synchronous Optical Network (SONET)/Synchronous Digital Hierarchy (SDH), protection techniques such as Bidirectional Line Switched Ring, Telcordia GR-1230-CORE (BLSR), Multiplex Section Shared Protection Ring, ITU-T G.841 (MSSPRING), and others are used.

These protection technique performs fault recovery by turning a path back at both nodes of a fault link. When this technique is adapted to a ring network in which wavelengths are multiplexed, a protection ring which is configured in each wavelength channel independently operates.

However, a process of turning a path back in each wavelength channel increases a processing load on an optical transmission apparatus, and therefore fast recovery is difficult. To deal with this problem, think of combining the ITU-TG. 808.1 group protection scheme. This approach sets a plurality of wavelength channels to one group, and when faults occur in one or more wavelength channels in a group, paths using all wavelength channels of the group are collectively switched, and therefore fast recovery is realized.

There are proposed a method for detecting a fault occurring in each optical wave path at its path end and performing fault recovery on an optical wave path basis in a wavelength division multiplex (WDM) transmission network, and a transmission apparatus for implementing the method (see, for example, Japanese Laid-open Patent publication No. 2000-209152).

However, a method for switching paths in a group of a plurality of wavelength channels has a drawback in that, when there is a plurality of portions in which a fault has occurred in a part of wavelength channel in the ring, path switching is performed in each fault portion, and therefore all of the paths including normal paths may be cut off.

SUMMARY

In one aspect of the embodiments, there is provided an optical transmission apparatus for transmitting an optical signal. The optical transmission apparatus includes: a path information table which stores paths set in a network and wavelength channel information on the paths; and a controller which searches for an apparatus which performs route switching of paths using a plurality of grouped wavelength channels, based on fault information on the network detected by the optical transmission apparatus, fault information on the network detected by another optical transmission apparatus, and the paths and wavelength channel information on the paths stored in the path information table, wherein the controller performs the route switching of the paths upon determining that a number of operating paths is maximized by performing the route switching of the paths in the optical transmission apparatus.

The object and advantages of the invention will be realized and attained by means of the devices and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of APS information;

FIG. 8 illustrates an example of a path information table;

FIG. 36 illustrates an example of a path information table according to a fourth embodiment;

DESCRIPTION OF EMBODIMENTS

Figure 1:
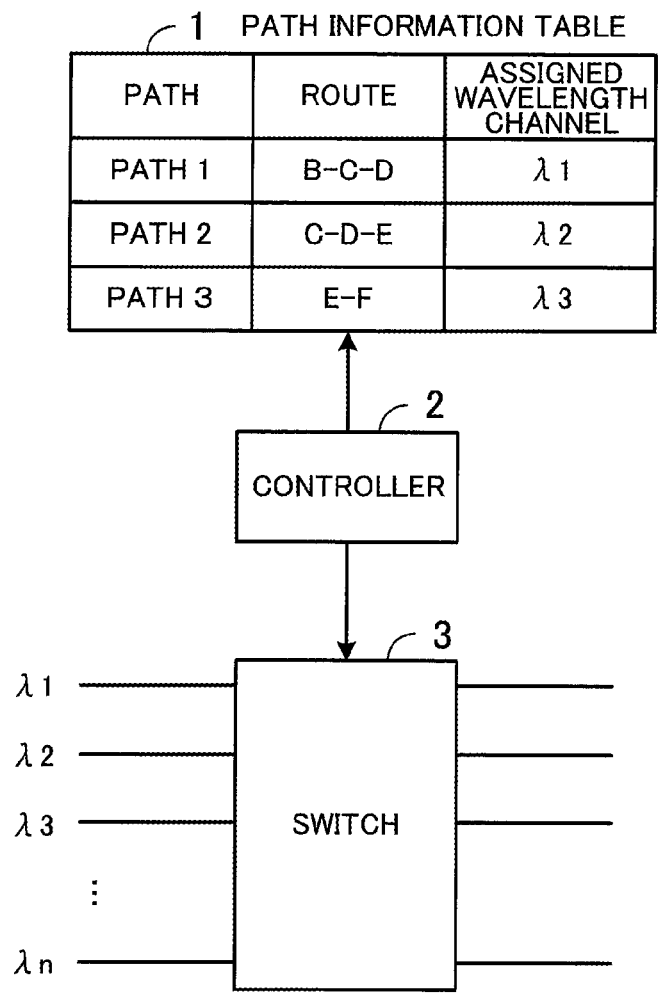
FIG. 1 illustrates an optical transmission apparatus according to a first embodiment.

Several embodiments will be described below with reference to the accompanying drawings, wherein like reference numerals refer to like elements throughout.

First Embodiment

FIG. 1 illustrates an optical transmission apparatus according to a first embodiment. As illustrated in FIG. 1, the optical transmission apparatus includes a path information table 1, a controller 2, and a switch 3. For example, the optical transmission apparatus illustrated in FIG. 1 forms a ring network with other optical transmission apparatus (not illustrated).

In the path information table 1, paths set in the network and wavelength channel information of the paths are stored. As illustrated in FIG. 1, for example, the path information table 1 has the following columns: path, route, and assigned wavelength channel. For example, the path information table 1 as illustrated in FIG. 1 indicates that a path 1 is routed via nodes B, C, and D of the network, and is assigned a wavelength channel λ1.

Based on fault information of the network detected by the optical transmission apparatus, fault information of the network detected by the other optical transmission apparatus, and the paths and wavelength channel information of the paths stored in the path information table 1, the controller 2 searches for an apparatus which performs route switching of paths using a plurality of grouped wavelength channels.

Suppose, for example, that the optical transmission apparatus and the other optical transmission apparatus set wavelength channels λ1 to λ3 to one group, and perform route switching of paths using the plurality of grouped wavelength channels. When a fault occurs on the network, the controller 2 searches, based on fault information and the paths and wavelength channel information of the paths stored in the path information table 1, for an apparatus which performs route switching of the paths 1 to 3 using the plurality of grouped wavelength channels λ1 to λ3. Specifically, based on the fault information, the controller 2 detects the span and wavelength channel where the fault is occurring. With reference to the path information table 1, the controller then searches for which optical transmission apparatus switches the group of the wavelength channels λ1 to λ3.

Upon determining that the number of operating paths is maximized by using the optical transmission apparatus to perform route switching of the paths, the controller 2 performs the route switching of the paths in the optical transmission apparatus.

For example, if the controller 2 determines that the number of operating paths is maximized by using the switch 3 of its own apparatus out of apparatuses under search (including the optical transmission apparatus) to switch the paths 1 to 3 using the grouped wavelength channels λ1 to λ3, the controller 2 controls the switch 3 so as to perform the route switching of the paths. On the other hand, if the controller 2 determines that the number of operating paths is not maximized by using the switch 3 of its own apparatus to switch the paths 1 to 3, the controller 2 does not perform the route switching of the paths with the switch 3.

As described above, upon determining that the number of operating paths is maximized by performing the route switching of paths in the optical transmission apparatus, the controller 2 of the optical transmission apparatus performs the route switching of the paths. This approach makes it possible to keep using as many operating paths as possible.

Second Embodiment

A second embodiment will be described in detail below with reference to the drawings.

Figure 2:
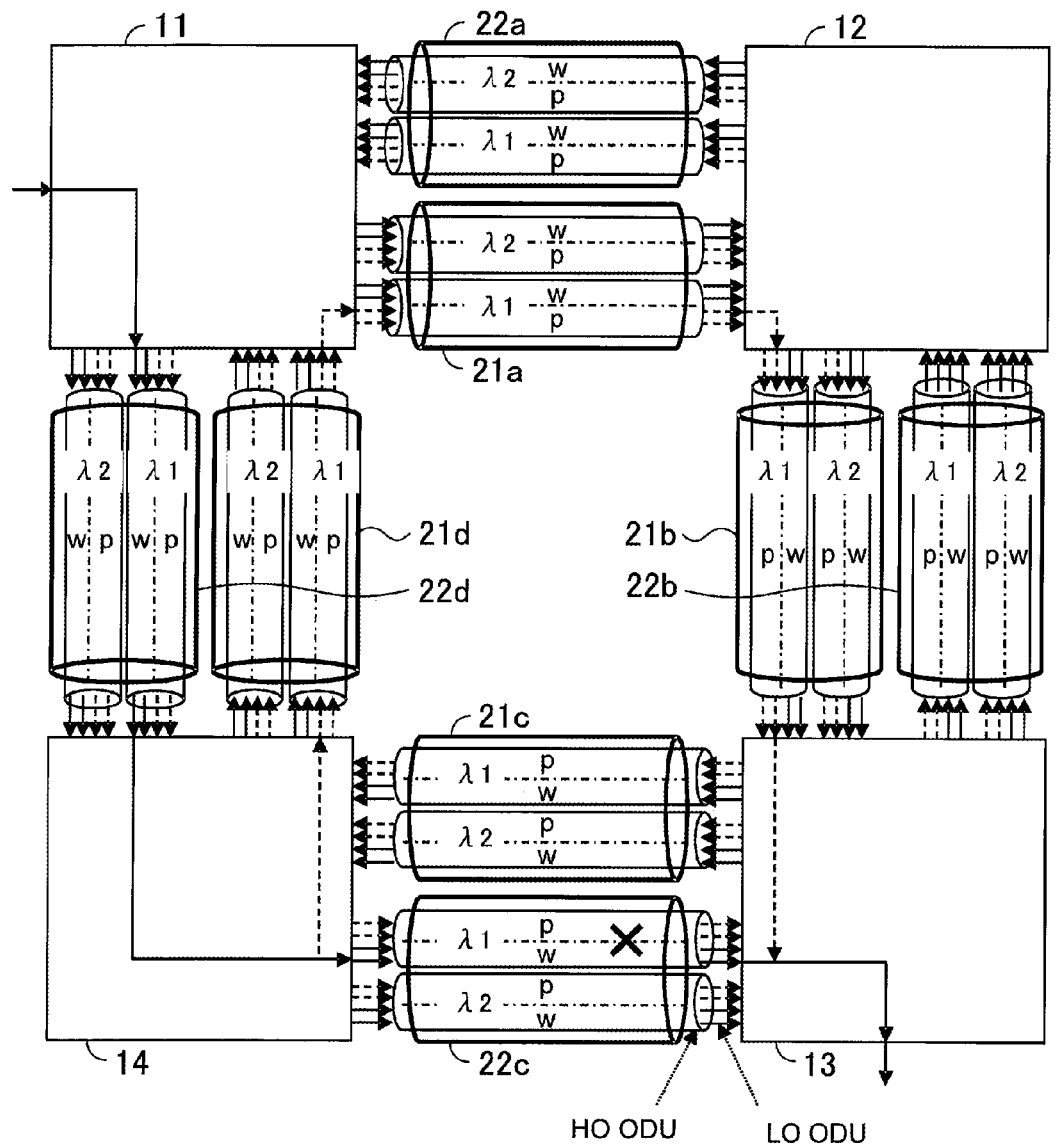
FIG. 2 illustrates one example of an optical network system according to a second embodiment.

FIG. 2 illustrates one example of an optical network system according to the second embodiment. FIG. 2 illustrates a 2-fiber BLSR ring network by way of example.

As illustrated in FIG. 2, the optical network system has optical transmission apparatus 11 to 14. The optical transmission apparatus 11 to 14 are connected through optical fibers 21a to 21d and 22a to 22d. Hereinafter, the optical transmission apparatus may be referred to as nodes.

The nodes 11 to 14 transmit optical signals in the clockwise direction through the optical fibers 21a to 21d. The nodes 11 to 14 further transmit optical signals in the counterclockwise direction through the optical fibers 22a to 22d.

Through the optical fibers 21a to 21d, optical signals on wavelength channels λ1 and λ2 are transmitted. Also, through the optical fibers 22a to 22d, optical signals on wavelength channels λ1 and λ2 are transmitted. As illustrated in FIG. 2, the wavelength channels λ1 and λ2 correspond to HO ODU (Higher Order Optical channel Data Unit).

A plurality of signals are multiplexed on each of the wavelength channels λ1 and λ2. Signals multiplexed on each of the wavelength channels λ1 and λ2 correspond to LO ODU (Lower Order ODU). The wavelength channels λ1 and λ2 each have a working wavelength channel (w in the figure) and a spare wavelength channel (p in the figure).

Solid line arrows illustrated in FIG. 2 indicate an example of a path at normal times (without any fault). In the normal state, data is transmitted from the node 11 to the node 13.

Dotted line arrows illustrated in FIG. 2 indicate an example of the path at the time when a fault occurs. Suppose, for example, that as indicated in an x-mark of FIG. 2, a fault has occurred between the nodes 13 and 14. In this case, the node 14 performs ring switching so as to turn data received from the node 11 back to the node 11 which then transmits the received data to the node 12. The node 12 transmits to the node 13 the data received from the node 11. This approach makes it possible to avoid interruption of data transfer due to the fault occurring between the nodes 13 and 14.

Figure 3:
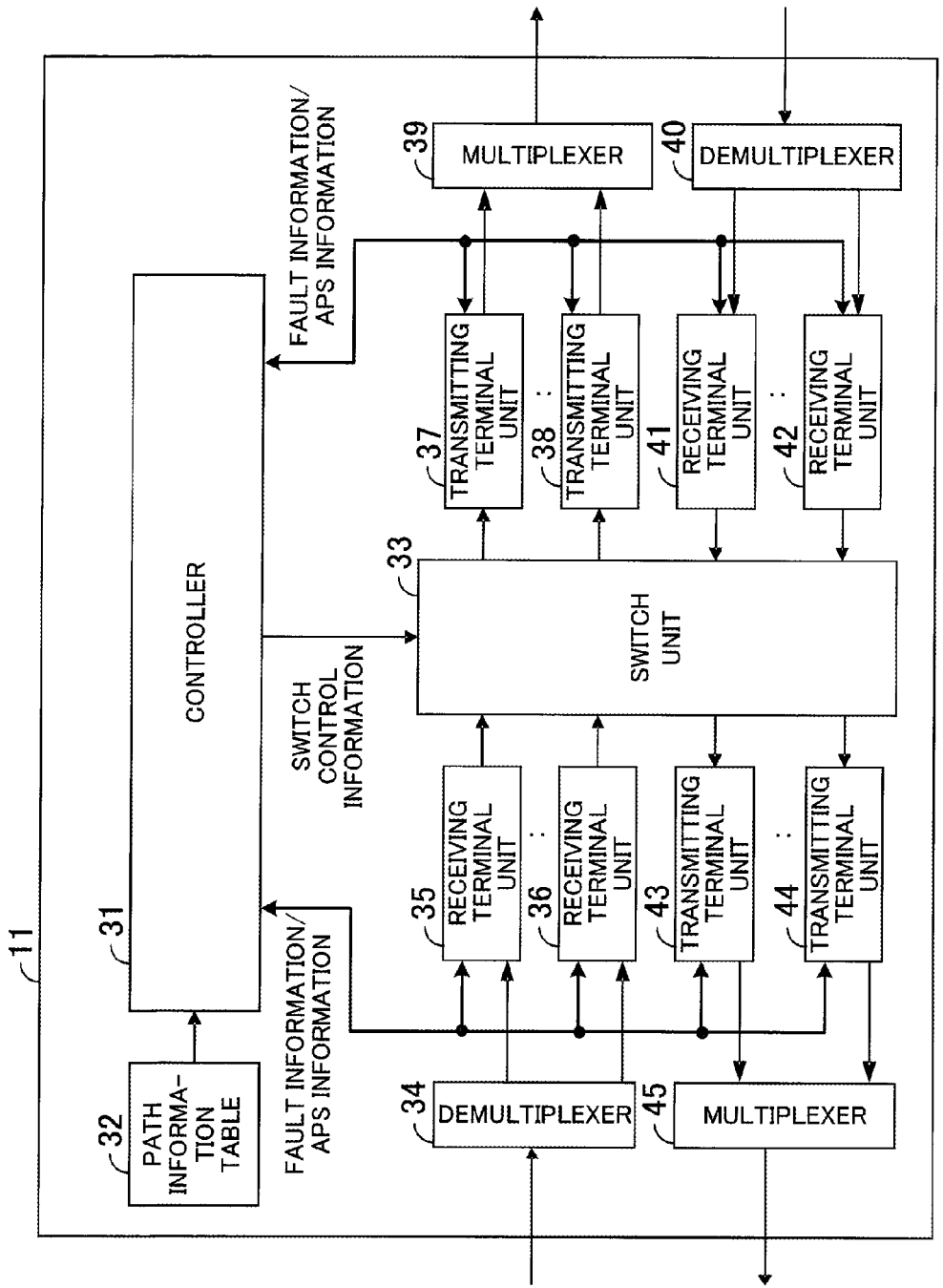
FIG. 3 is a block diagram of an optical transmission apparatus.

FIG. 3 is a block diagram of an optical transmission apparatus. As illustrated in FIG. 3, the node has a controller 31, a path information table 32, a switch unit 33, demultiplexers 34 and 40, receiving terminal units 35, 36, 41, and 42, transmitting terminal units 37, 38, 43, and 44, and multiplexers 39 and 45. FIG. 3 illustrates the only two receiving terminal units 35 and corresponding to the demultiplexer 34. However, the receiving terminal units are provided so as to correspond to the wavelengths of light that propagates via the nodes 11 to 14. Further, FIG. 3 illustrates the only two receiving terminal units 41 and 42 corresponding to the demultiplexer 40. However, the receiving terminal units are provided so as to correspond to the wavelengths of light that propagates via the nodes 11 to 14. Still further, FIG. 3 illustrates the only two transmitting terminal units 37 and 38 corresponding to the multiplexer 39. However, the transmitting terminal units are provided so as to correspond to the wavelengths of light that propagates via the nodes 11 to 14. Still further, FIG. 3 illustrates the only two transmitting terminal units 43 and 44 corresponding to the multiplexer 45. However, the transmitting terminal units are provided so as to correspond to the wavelengths of light that propagates via the nodes 11 to 14.

The controller 31 collects fault information and APS (Automatic Protection Switching) information from the receiving terminal units 35, 36, 41, and 42, and supplies appropriate APS information to the transmitting terminal units 37, 38, 43, and 44. This enables the node 11 to perform fault recovery in collaboration with the other nodes 12 to 14.

Based on the fault information, APS information, and path information stored in the path information table 32, the controller 31 further supplies switch control information to the switch unit 33. Suppose, for example, that the controller 31 determines that path switching is needed in the node 11, based on the fault information detected by the receiving terminal units 35, 36, 41, and 42, the fault information (APS information) detected by the other nodes 12 to 14, and the path information stored in the path information table 32. In this case, the controller 31 supplies the switch control information for performing path switching in the node 11 to the switch unit 33.

The path information table 32 stores route information on paths set in the ring, information on assigned wavelength channels, etc.

The switch unit 33 configures a path for routing input and output signals. When a fault occurs, the switch unit 33 turns back a signal based on the switch control information received from the controller 31, to thereby avoid the fault.

The demultiplexers 34 and 40 demultiplex wavelength-multiplexed received signal light into individual wavelengths. The multiplexers 39 and 45 multiplex transmission signals of different wavelengths.

The receiving terminal units 35, 36, 41, and 42 terminate the received signals demultiplexed by the demultiplexers 34 and 40, detect a fault of each wavelength, and extract APS information used for path switching control. The extracted fault information and APS information are supplied to the controller 31.

The transmitting terminal units 37, 38, 43, and 44 supply to the multiplexers 39 and 45 a signal including the APS information produced from the controller 31.

The node 11 has been described above with reference to FIG. 3; further, the other nodes 12 to 14 configuring the ring network also have the same blocks.

Before describing the path switching performed by the node 11, operations of simply switching a group of a plurality of wavelength channels will be described.

Figure 4:
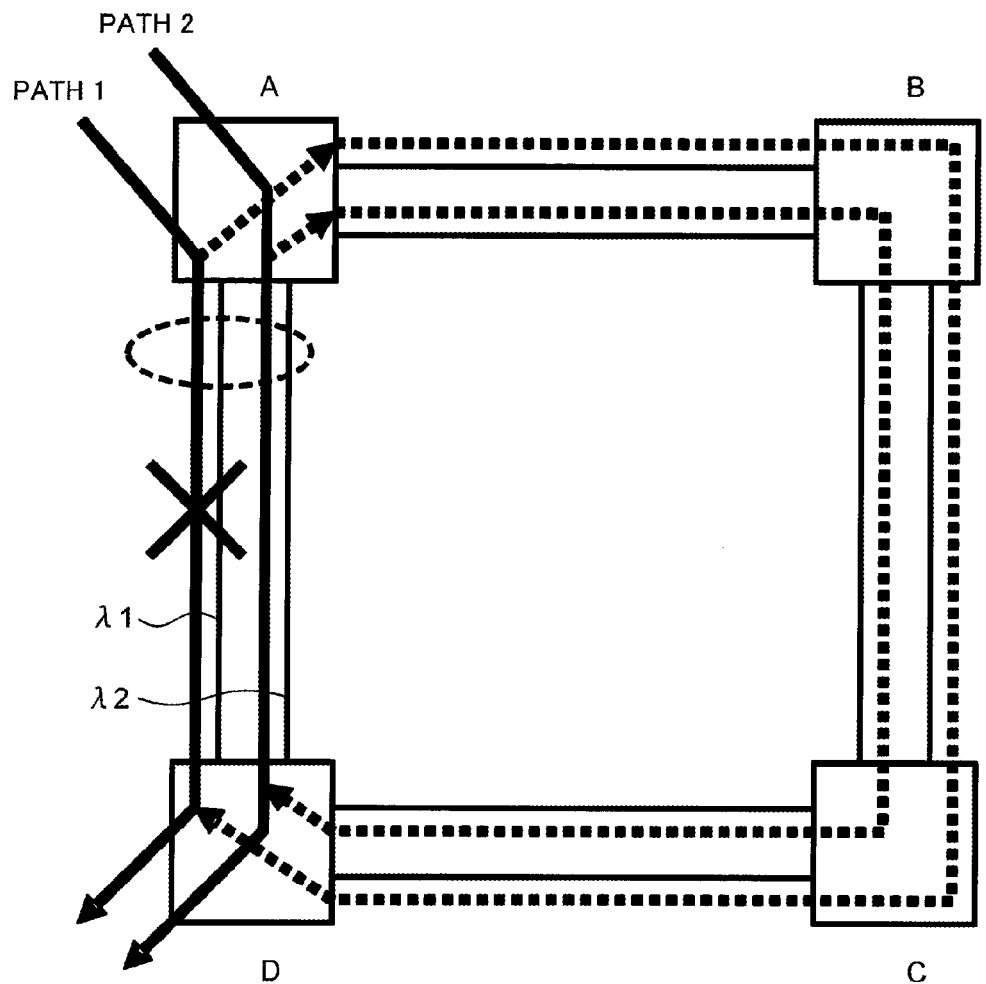
FIG. 4 illustrates how to simply switch a group of a plurality of wavelength channels (part 1)

FIG. 4 illustrates how to simply switch a group of a plurality of wavelength channels (part 1). Referring to FIG. 4, nodes A to D are illustrated, a path 1 uses a wavelength channel λ1 between the nodes A and D, and a path 2 uses a wavelength channel λ2 between the nodes A and D.

The nodes A to D treat as one group a plurality of wavelength channels λ1 and λ2. For example, when a fault occurs in a wavelength channel λ1, λ2 of the ring network, the nodes A to D collectively switch the wavelength channels λ1 and λ2.

Suppose, for example, that a fault has occurred in the wavelength channel λ1 between the nodes A and D, as indicated in an x-mark of FIG. 4. In this case, the nodes A and D perform ring switching. For example, the ring switching is performed in such a way that the node A collectively supplies signals of the paths 1 and 2 to the node B so as to transmit them to the node D through the node C, and the node D collectively receives the signals of the paths 1 and 2 transmitted through the nodes B and C. This approach makes it possible to avoid the fault occurring between the nodes A and D.

Figure 5:
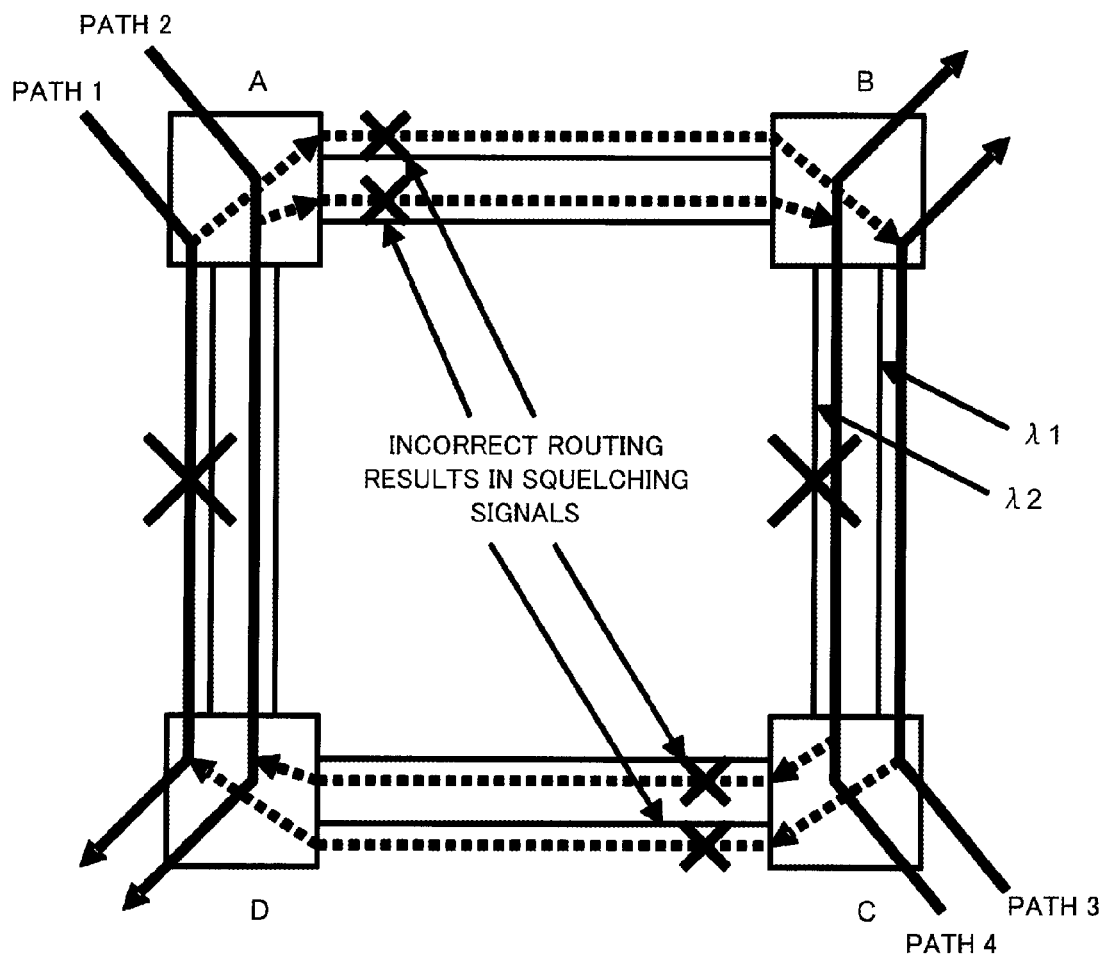
FIG. 5 illustrates how to simply switch a group of a plurality of wavelength channels (part 2)

FIG. 5 illustrates how to simply switch a group of a plurality of wavelength channels (part 2). The same circuit elements of FIG. 5 as those of FIG. 4 will not be described again. In addition to the paths illustrated in FIG. 4, FIG. 5 illustrates a path 3 that uses the wavelength channel λ1 between the nodes B and C, and a path 4 that uses the wavelength channel λ2 between the nodes B and C.

As compared with FIG. 4, FIG. 5 illustrates a plurality of portions where a fault is occurring in the wavelength channels in the ring. In FIG. 5, for example, two faults are occurring in the ring as indicated by two large x-marks. More specifically, in FIG. 5, one fault is occurring in the wavelength channel λ1 between the nodes A and D, and the other fault is occurring in the wavelength channel λ2 between the nodes B and C.

In the case where such faults occur, the nodes A and D perform the ring switching in the same way as in FIG. 4. In addition, in order to avoid the fault occurring between the nodes B and C, the nodes B and C perform ring switching in such a way that the node C collectively supplies signals of the paths 3 and 4 to the node D, and the node B receives the signals of the paths 3 and 4 via the nodes D and C.

However, when the nodes A and D perform the ring switching and the nodes B and C perform the ring switching, the paths are incorrectly routed. As indicated by dotted line arrows, for example, the signals of the paths 1 and 2 are received not by the node D but by the node B, and as a result, the paths are incorrectly routed. In addition, as indicated by dotted line arrows, the signals of the paths 3 and 4 are received not by the node B but by the node D. Therefore, the signals on the paths 1 to 4 are squelched as indicated by small x-marks of FIG. 5, and transmission of all the signals of the paths 1 to 4 is cut off.

That is, in the case of the example of FIG. 5 in which all of the nodes A to D perform the ring switching, transmission of all the signals of the paths 1 to 4 is cut off. However, if some of the nodes A to D do not perform ring switching, signal transmission using the fault-free paths 2 and 3 is maintained.

To this end, based on the information stored in the path information table 32, APS information, and fault information, the nodes 11 to 14 determine switching of signals (paths) so as to keep using as many paths as possible. In the case of the example of FIG. 5, for example, the nodes A to D keep the signal transmission of the normal paths 2 and 3 by determining not to switch grouped wavelength channels (signals).

The path switching performed by the node 11 will be described.

Figure 6:
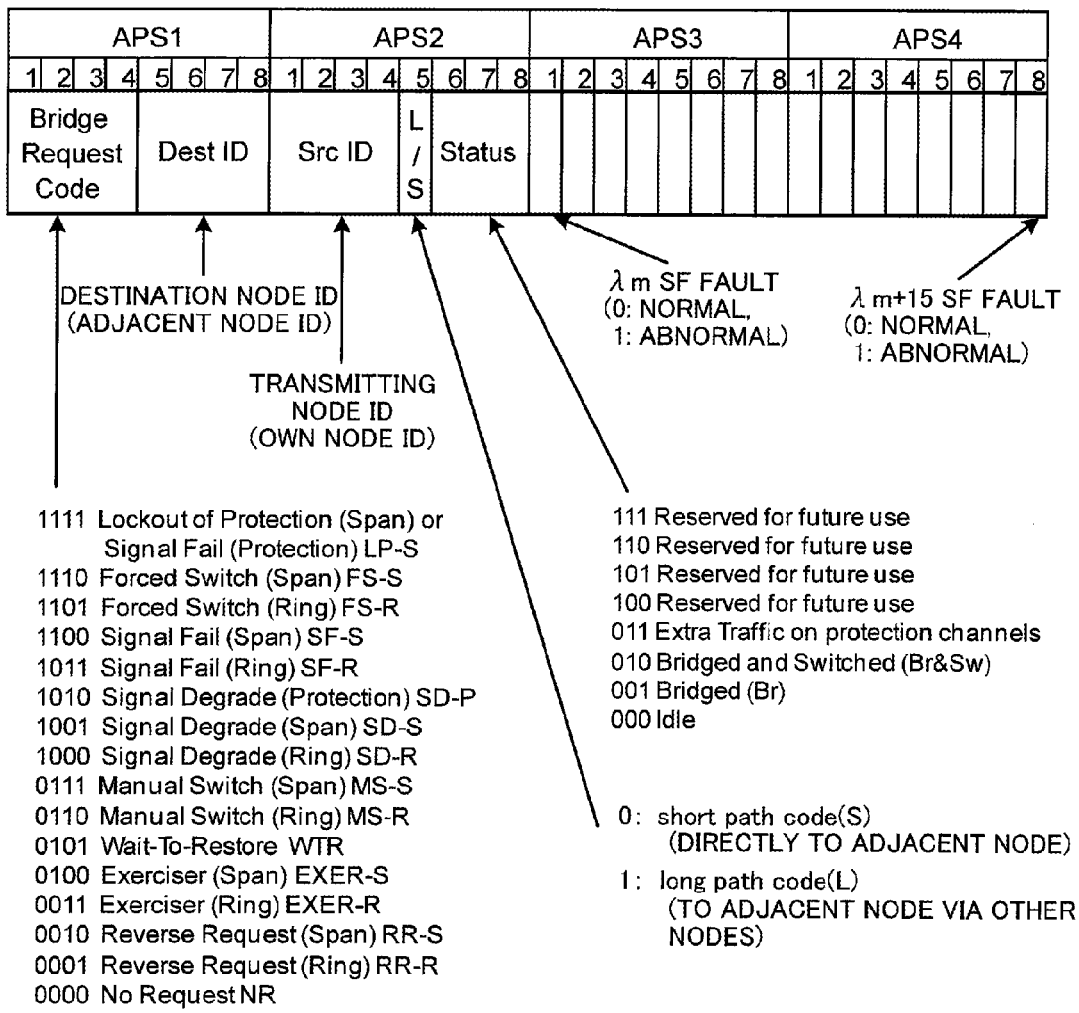
FIG. 6 illustrates an example of APS information.

FIG. 6 illustrates an example of APS information. The APS information is transferred between the nodes 11 to 14 for controlling switching performed by the nodes 11 to 14.

In the ITU-T G.709 OTN, four APS bytes are defined in an ODU overhead, and the nodes 11 to 14 perform path switching by using the APS bytes.

For the purpose of collectively switching a group of a plurality of wavelength channels, the nodes 11 to 14 previously determine a representative wavelength channel of each group. The nodes 11 to 14 use the APS bytes of HO ODU encapsulated as the predetermined wavelength channel.

The first and second bytes of the APS bytes are almost the same as those of conventional MS-SPRing/BLSR. In the third and fourth bytes, fault information of each wavelength channel in a group is stored. For example, when a wavelength channel in the group is normal, the fault information is set to '0', whereas when the wavelength channel in the group is abnormal, the fault information is set to '1'. In the example of FIG. 6, 16 wavelength channels at maximum is grouped into one group.

FIG. 7 illustrates an example of APS information. FIG. 7 illustrates the case where the number of wavelength channels in one group is greater than 16.

In FIG. 7, the APS information of frames #x, #x+1, . . . , and #x+y is illustrated. As illustrated in FIG. 7, when more than 16 wavelength channels are grouped into one group, the APS information is configured by using a plurality of frames.

FIG. 8 illustrates an example of a path information table. As illustrated in FIG. 8, the path information table 32 of the node 11 has the following columns: path, route, and assigned wavelength channel.

In the path column, information on paths set in a ring network is stored. For example, when there are paths 1 to 3 in a ring network, these paths 1 to 3 are registered as illustrated in FIG. 8.

In the route column, the routes of the paths stored in the path column are stored. Suppose, for example, that the nodes 11 to 14 illustrated in FIG. 2 are given identifiers of A to D, respectively. If the path 1 passes through the nodes 12, 13, and 14, B-C-D is registered in the route column corresponding to the path 1.

In the assigned wavelength channel column, information on a wavelength channel assigned to a path is stored. For example, if the path 1 is assigned the wavelength channel $\lambda 1$, $\lambda 1$ is registered in the assigned wavelength channel column corresponding to the path 1.

The path information table 32 of the node 11 has been described. Also, the other nodes 12 to 14 each have a path information table storing the same information as that of the path information table 32.

Figure 9:
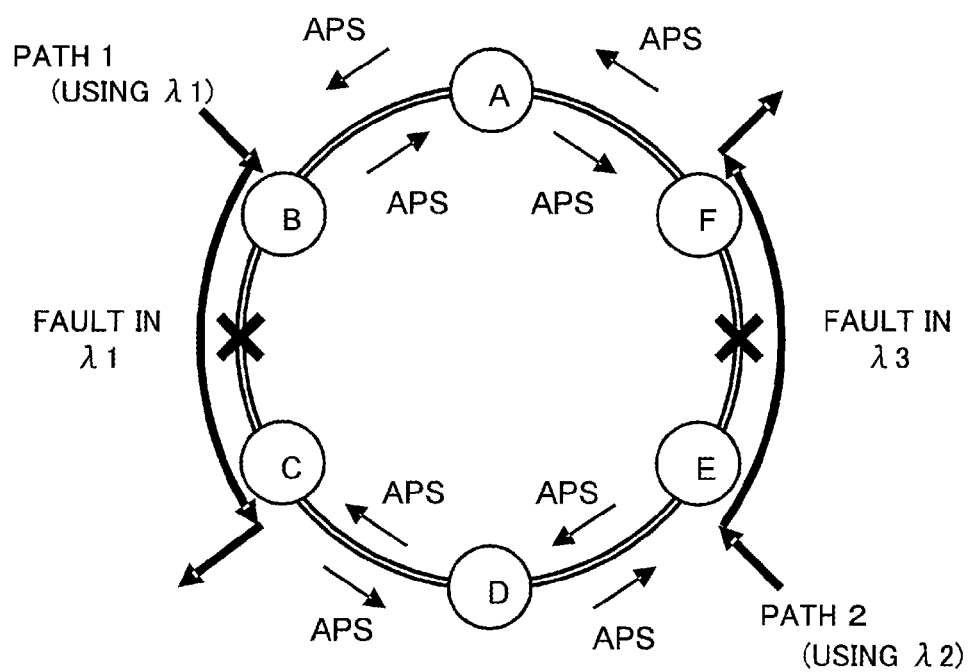
FIG. 9 illustrates path switching.

FIG. 9 illustrates path switching. A to F illustrated in FIG. 9 denote nodes. The nodes A to F each have the same blocks as the node 11 illustrated in FIG. 3. The nodes A to F configure a ring network as illustrated in FIG. 9.

In FIG. 9, for simple explanation, the ring network does not correspond to that of FIG. 2. Further, path information of FIG. 9 does not correspond to that of the path information table 32 illustrated in FIG. 8.

In the example of FIG. 9, a path 1 is set in a route between the nodes B and C, and uses a wavelength channel $\lambda 1$. A path 2 is further set in a route between the nodes E and F, and uses a wavelength channel $\lambda 2$.

The wavelength channels $\lambda 1$ to $\lambda 3$ are supposed to be set to one group. Accordingly, to perform ring switching of the paths 1 and 2, the nodes B, C, E, and F collectively perform ring switching of the wavelength channels $\lambda 1$ to $\lambda 3$.

In FIG. 9, a fault is supposed to have occurred in the wavelength channel $\lambda 1$ between the nodes B and C. Another fault is also supposed to have occurred in the wavelength channel $\lambda 3$ between the nodes E and F.

The above-described information on paths is stored in the path information table of each of the nodes A to F. Specifically, route information on the paths 1 and 2 and information on assigned wavelength channels are stored in the path information table of each of the nodes A to F.

As indicated in arrows of FIG. 9, the nodes A to F exchange APS information. This enables the nodes A to F to obtain a path switching request and fault information of each wavelength channel.

The controller of each of the nodes B, C, E, and F searches its own node and the other nodes that may perform switching, and detects the following four switching patterns based on the fault information detected by its own node and the APS information received from the other nodes.

The pattern (a) is that the nodes B and C perform switching. The pattern (b) is that the nodes E and F perform switching. The pattern (c) is that the nodes B, C, E, and F perform switching. The pattern (d) is that the nodes B, C, E, and F do not perform switching.

With respect to each of these four patterns (a) to (d), the controller of each of the nodes B, C, E, and F that may perform switching calculates how many paths normally operate, and compares them. The controller then selects ring switching that provides the maximum number of normally operating paths.

Based on fault information on the wavelength channel $\lambda 1$ between the nodes B and C which is detected by its own node, for example, the node B detects that the nodes B and C are to perform switching. Based on fault information on the wavelength channel $\lambda 3$ between the nodes E and F which is obtained from the APS information, for example, the node B detects that the nodes E and F are to perform switching. The other nodes A and C to F obtain the same detection results. Namely, the nodes A to F detects that the nodes B, C, E, and F are to perform the switching.

The following describes how to obtain the number of normally operating paths for each of the above-described patterns (a) to (d).

Figure 10:
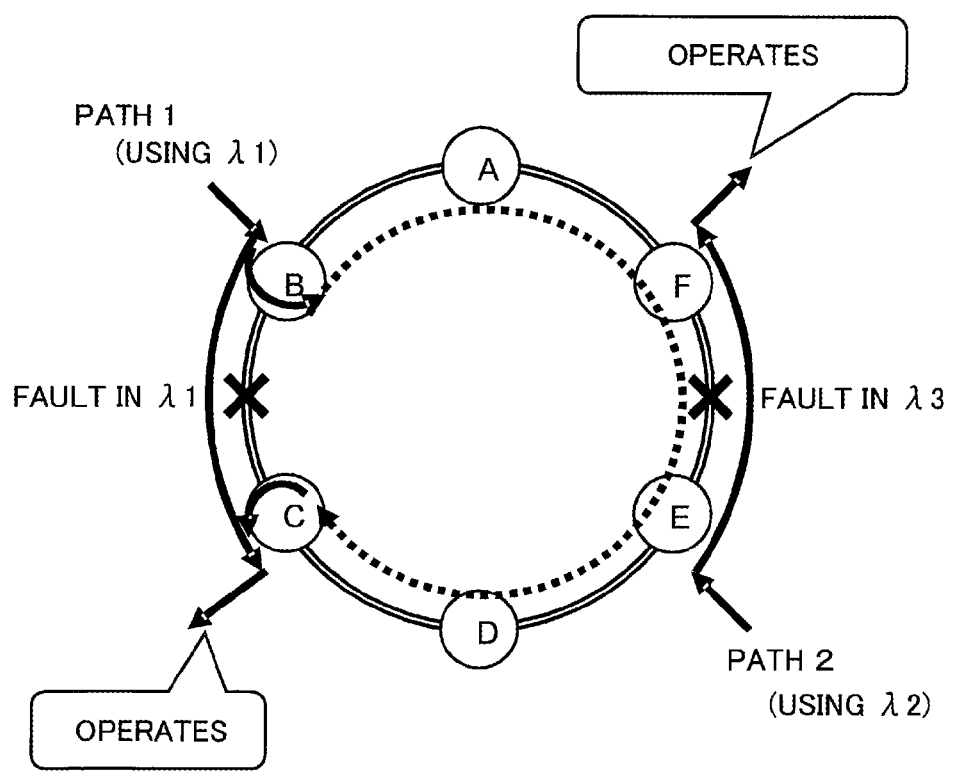
FIG. 10 is a view for explaining the number of normally operating paths in a pattern (a)

FIG. 10 is a view for explaining the number of normally operating paths in the pattern (a). A ring network illustrated in FIG. 10 is the same as that of FIG. 9, and therefore the description thereof will not be repeated here. The following describes how the node B operates. The other nodes C, E, and F obtain the same calculation results as the node B.

Assuming that the nodes B and C perform ring switching, the node B counts (calculates) the number of normally operating paths. For example, assuming that the nodes B and C perform ring switching as indicated in a dotted line arrow of FIG. 10, the node B counts the number of normally operating paths.

For example, in the case where the nodes B and C perform ring switching, a route indicated in the dotted line arrow of FIG. 10 is free from a fault of the wavelength channel $\lambda 1$. Therefore, the path 1 is recovered and becomes a normal path. Further, since not related to the fault of the wavelength channel $\lambda 3$, the path 2 of the wavelength channel $\lambda 2$ is a normal path. Accordingly, the node B counts '2' as the number of normally operating paths.

Figure 11:
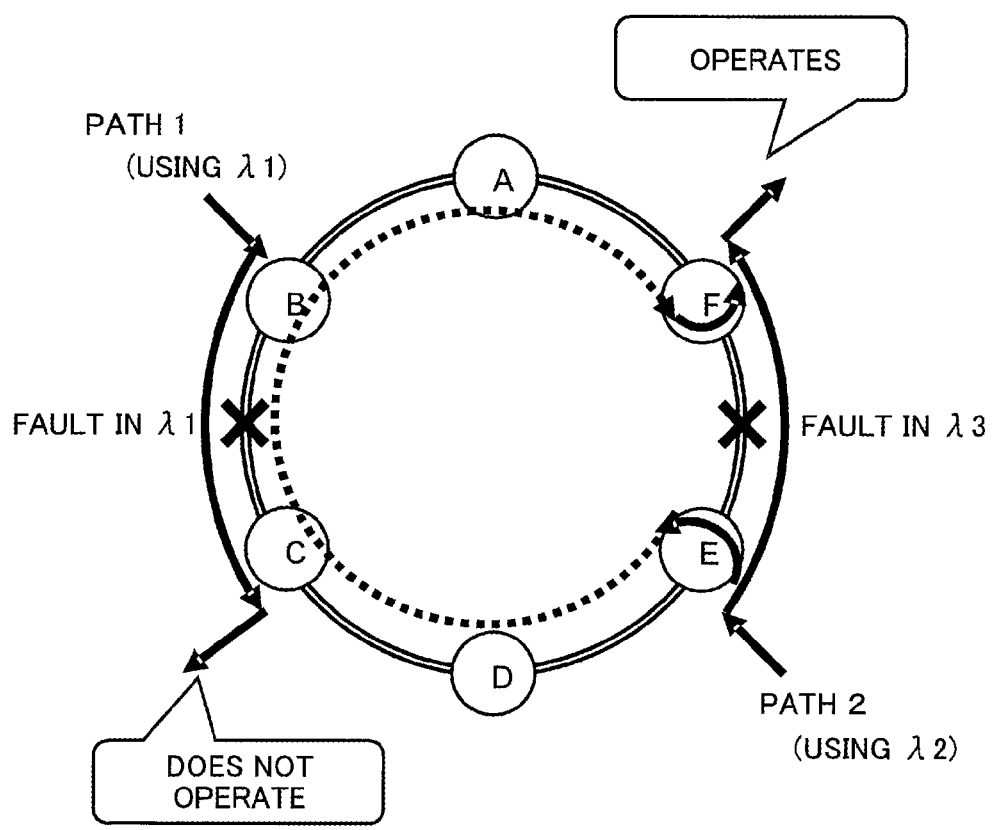
FIG. 11 is a view for explaining the number of normally operating paths in a pattern (b)

FIG. 11 is a view for explaining the number of normally operating paths in the pattern (b). A ring network illustrated in FIG. 11 is the same as that of FIG. 9, and the description thereof will not be repeated here. The following describes how the node B operates. The other nodes C, E, and F obtain the same calculation results as the node B.

Assuming that the nodes E and F perform ring switching, the node B counts the number of normally operating paths. For example, assuming that the nodes E and F perform ring switching as indicated in a dotted line arrow of FIG. 11, the node B counts the number of normally operating paths.

In the case where the nodes E and F perform ring switching, the fault path 1 is not recovered, and thus still does not normally operate. On the other hand, the path 2 normally operates since the wavelength channel λ2 used in a route indicated in the dotted line arrow of FIG. 11 is free from faults. Accordingly, the node B counts '1' as the number of normally operating paths.

Figure 12:
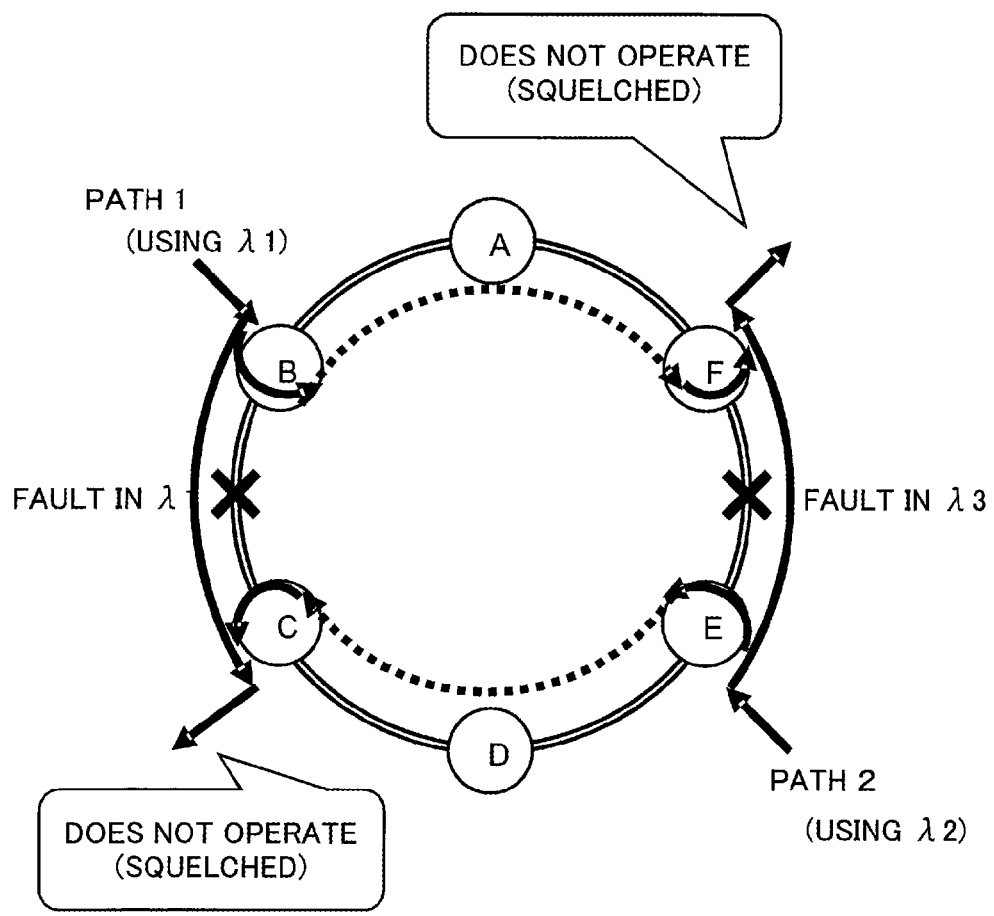
FIG. 12 is a view for explaining the number of normally operating paths in a pattern (c)

FIG. 12 is a view for explaining the number of normally operating paths in the pattern (c). A ring network illustrated in FIG. 12 is the same as that of FIG. 9, and the description thereof will not be repeated here. The following describes how the node B operates. The other nodes C, E, and F obtain the same calculation results as the node B.

Assuming that the nodes B, C, E, and F perform ring switching, the node B counts the number of normally operating paths. For example, assuming that the nodes B, C, E, and F perform ring switching as indicated in dotted line arrows of FIG. 12, the node B counts the number of normally operating paths.

In the case where the nodes B, C, E, and F perform ring switching as indicated in a dotted line arrow of FIG. 12, for example, a signal of the path 1 is received not by the node C but by the node F. That is to say, the path 1 is incorrectly routed. Further, a signal of the path 2 is received not by the node F but by the node C. That is to say, the path 2 is also incorrectly routed. Accordingly, the node B counts '0' as the number of normally operating paths. In addition, squelch processing is performed in the paths 1 and 2, and an invalid signal is input into a payload of signals. User traffic of the paths 1 and 2 is then cut off.

Figure 13:
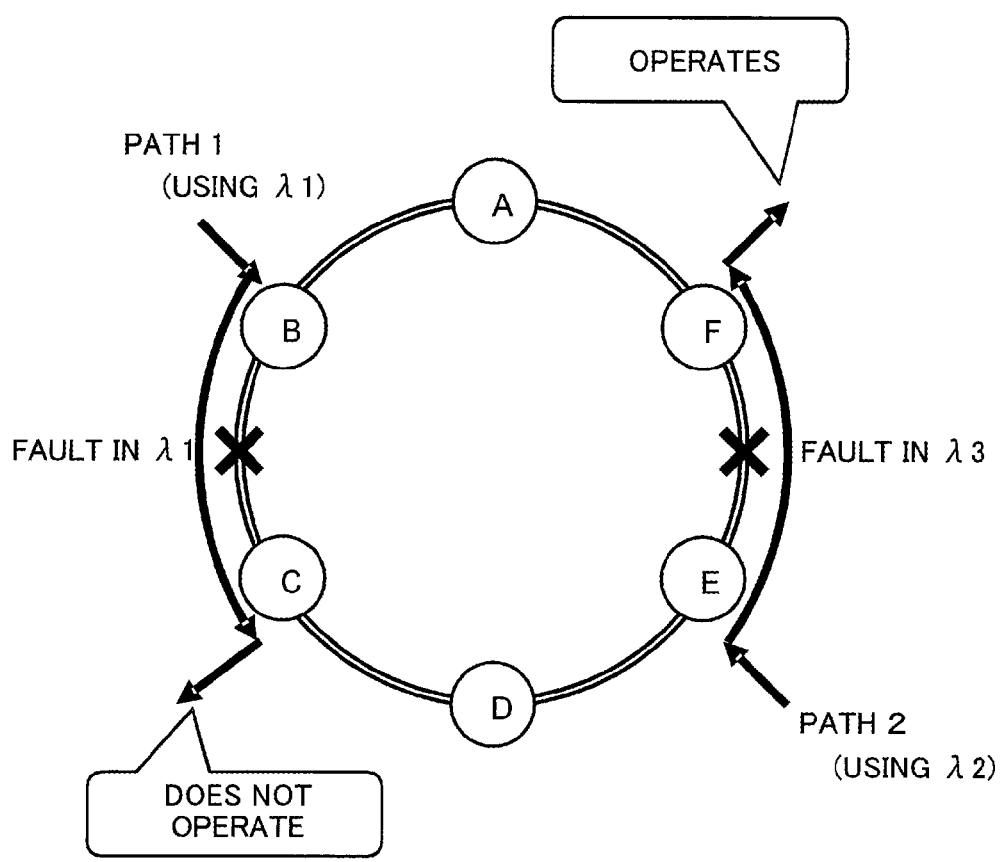
FIG. 13 is a view for explaining the number of normally operating paths in a pattern (d)

FIG. 13 is a view for explaining the number of normally operating paths in the pattern (d). A ring network illustrated in FIG. 13 is the same as that of FIG. 9, and the description thereof will not be repeated here. The following describes how the node B operates. The other nodes C, E, and F obtain the same calculation results as the node B.

Assuming that the nodes B, C, E, and F do not perform ring switching, the node B counts the number of normally operating paths.

For example, in the case where the nodes B, C, E, and F do not perform ring switching, the path 1 does not normally operate due to a fault. Since no fault occurs in the wavelength channel λ2, the path 2 normally operates. Accordingly, the node B counts '1' as the number of normally operating paths.

Based on the number of normally operating paths described with reference to FIGS. 10 to 13, the nodes B, C, E, and F select a switching pattern with the maximum number of normally operating paths from the four patterns (a) to (d). In the above-described examples of FIGS. 10 to 13, the switching pattern (a) has the maximum number of normally operating paths. Accordingly, only the nodes B and C out of the nodes B, C, E, and F perform ring switching.

Figure 14:
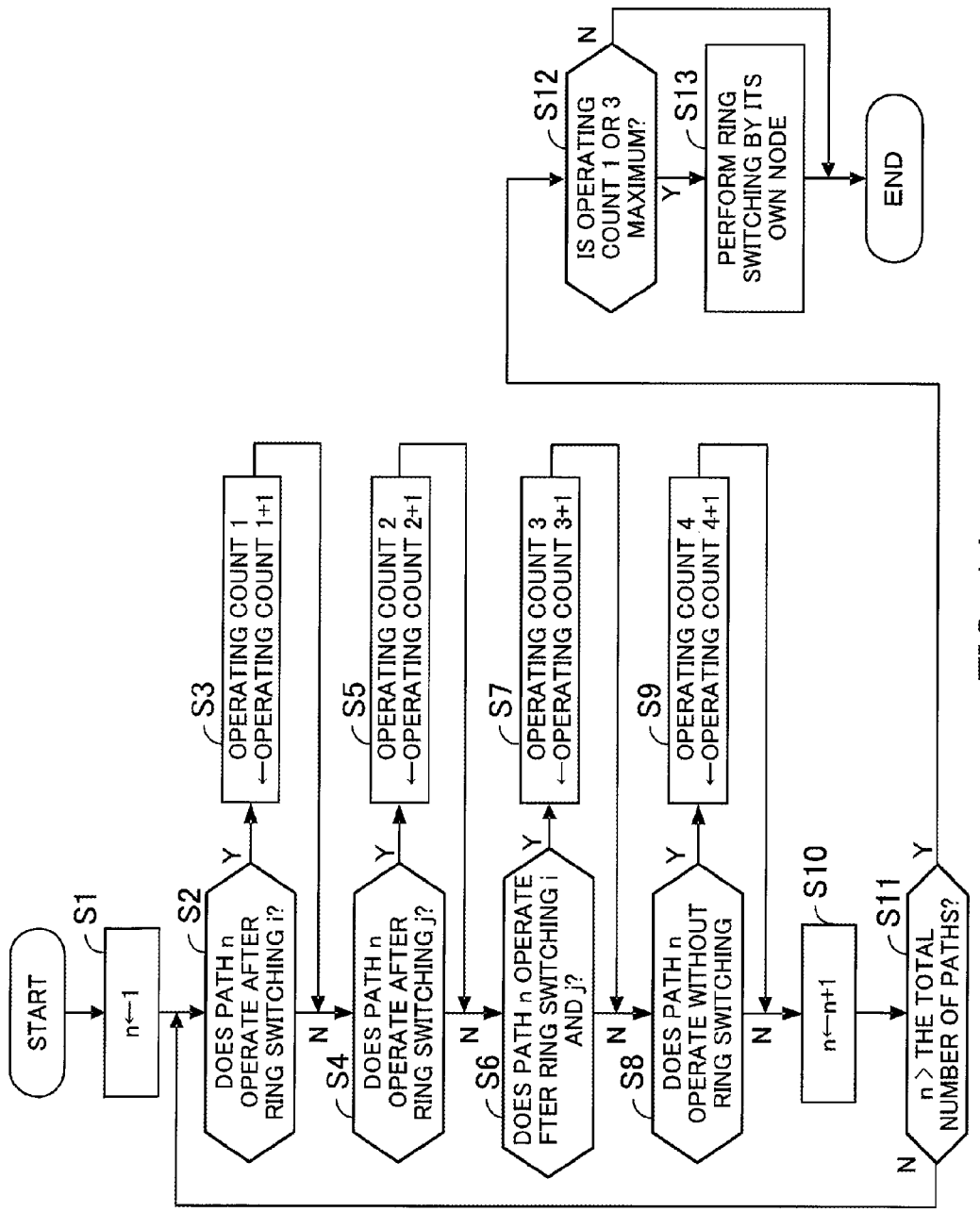
FIG. 14 is a flowchart illustrating calculation operations of the number of operating paths.

FIG. 14 is a flowchart illustrating how to calculate the number of operating paths. Ring switching i represents a loop back at both end nodes of a span i. The span i represents a span related to an own node (node B) (a span connected to the node B). Referring to the example of FIG. 9, for example, the span i corresponds to a span between the nodes B and C.

Ring switching j represents a loop back at both end nodes of a span j. The span j represents a span not related to an own node (node B) (a span not connected to the node B). Referring to an example of FIG. 9, for example, the span j corresponds to a span between the nodes E and F.

Based on fault information, APS information, and path information table, for example, the controllers of the nodes A to F illustrated in FIG. 9 each determine whether or not its own node is an end node of the span i or j. In other words, based on the fault information, APS information, and path information table, the controllers of the nodes A to F each determine whether its own node is a node which needs to perform ring switching. Each of the nodes B, C, E, and F which determine that their own nodes need to perform ring switching performs the following process. The following describes how the node B operates. The other nodes B, C, E, and F also perform the same operation.

With respect to each path set in the ring network, the node B determines whether the path operates or not, in the cases of performing the ring switching i, performing the ring switching j, performing the ring switching i and j, and performing no ring switching. For example, the above-described four cases correspond to the above-described patterns (a) to (d).

(Step S1) The controller of the node B substitutes 1 for a variable n.

(Step S2) The controller determines whether a path n operates after the ring switching i. If so, the controller advances to step S3. If not, the controller proceeds to step S4.

(Step S3) The controller adds 1 to a variable 'operating count 1'.

(Step S4) The controller determines whether the path n operates after the ring switching j. If so, the controller advances to step S5. If not, the controller proceeds to step S6.

(Step S5) The controller adds 1 to a variable 'operating count 2'.

(Step S6) The controller determines whether the path n operates after the ring switching i and j. If so, the controller advances to step S7. If not, the controller proceeds to step S8.

(Step S7) The controller adds 1 to a variable 'operating count 3'.

(Step S8) The controller determines whether the path n operates without any ring switching. If so, the controller advances to step S9. If not, the controller proceeds to step S10.

(Step S9) The controller adds 1 to a variable 'operating count 4'.

(Step S10) The controller adds 1 to the variable n.

(Step S11) The controller determines whether the variable n is greater than the total number of paths. If not, the controller returns to step S2. If so, the controller proceeds to step S12.

(Step S12) The controller determines whether the variable 'operating count 1' or 'operating count 3' is the maximum. Specifically, the controller determines whether the number of normally operating paths is maximized by performing the ring switching i related to its own node. If so, the controller advances to step S13 to perform the ring switching by its own node (node B). If not, the controller ends the process.

(Step S13) The controller performs the ring switching by its own node.

In the above-described process, as a result of counting the number of normally operating paths with respect to all of the paths, some cases may have the same maximum number of paths. In this case, one case is determined by applying a certain rule. For example, a priority is determined in ascending order of the number of ring switching portions, such as an order of "no ring switching", "ring switching i", "ring switching j", and "ring switching i and j".

For example, assuming that the "ring switching i" and the "ring switching j" have the same maximum number of paths, the IDs of the both end nodes of the spans are compared, thereby determining the priority. For example, if the end nodes of the span i have the IDs of 1 and 3, and the end nodes of the span j have the IDs of 2 and 4, the ring switching is performed in the span i having the smallest ID. If the end nodes of the span i have the IDs of 1 and 3, and the end nodes of the span j have the IDs of 1 and 2, the ring switching is performed in the span j having the second smallest ID.

Figure 15:
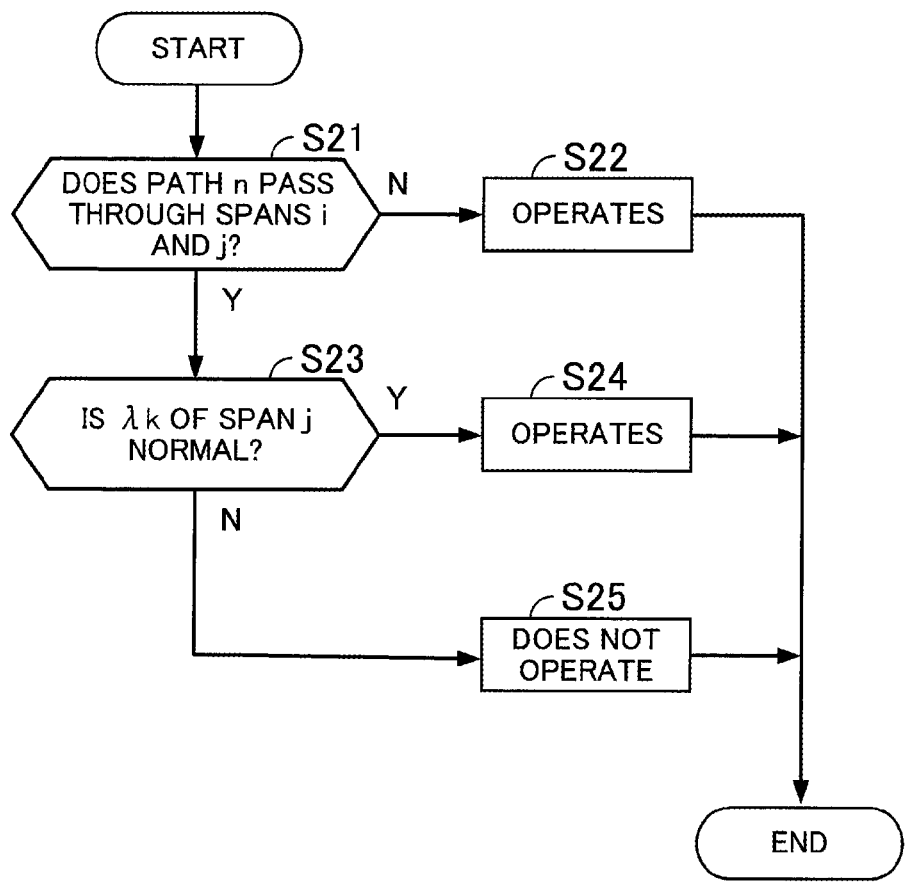
FIG. 15 is a flowchart for determining whether a path normally operates after the ring switching i.

FIG. 15 is a flowchart for determining whether a path normally operates after the ring switching i. Hereinafter, assume that the path n uses a wavelength channel λk. The controller executes the following steps to determine whether the path n normally operates after the ring switching i.

(Step S21) The controller determines whether the path n passes through the spans i and j. If not, the controller advances to step S22. If so, the controller proceeds to step S23.

(Step S22) The controller determines that the path n normally operates.

(Step S23) The controller determines whether the wavelength channel λk of the span j is normal. If so, the controller advances to step S24. If not, the controller proceeds to step S25.

(Step S24) The controller determines that the path n normally operates.

(Step S25) The controller determines that the path n does not normally operate.

Figure 16:
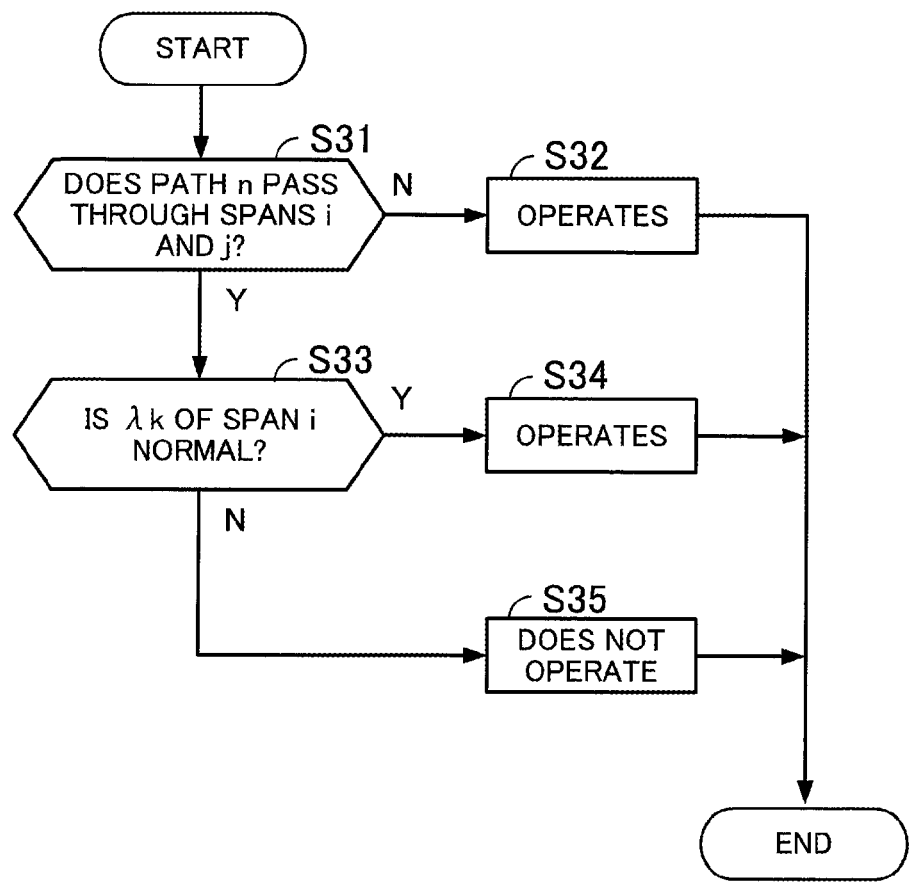
FIG. 16 is a flowchart for determining whether a path normally operates after the ring switching j.

FIG. 16 is a flowchart for determining whether a path normally operates after the ring switching j. The controller executes the following steps to determine whether a path n normally operates after the ring switching j.

(Step S31) The controller determines whether the path n passes through the spans i and j. If not, the controller advances to step S32. If so, the controller proceeds to step S33.

(Step S32) The controller determines that the path n normally operates.

(Step S33) The controller determines whether the wavelength channel λk of the span i is normal. If so, the controller advances to step S34. If not, the controller proceeds to step S35.

(Step S34) The controller determines that the path n normally operates.

(Step S35) The controller determines that the path n does not normally operate.

Figure 17:
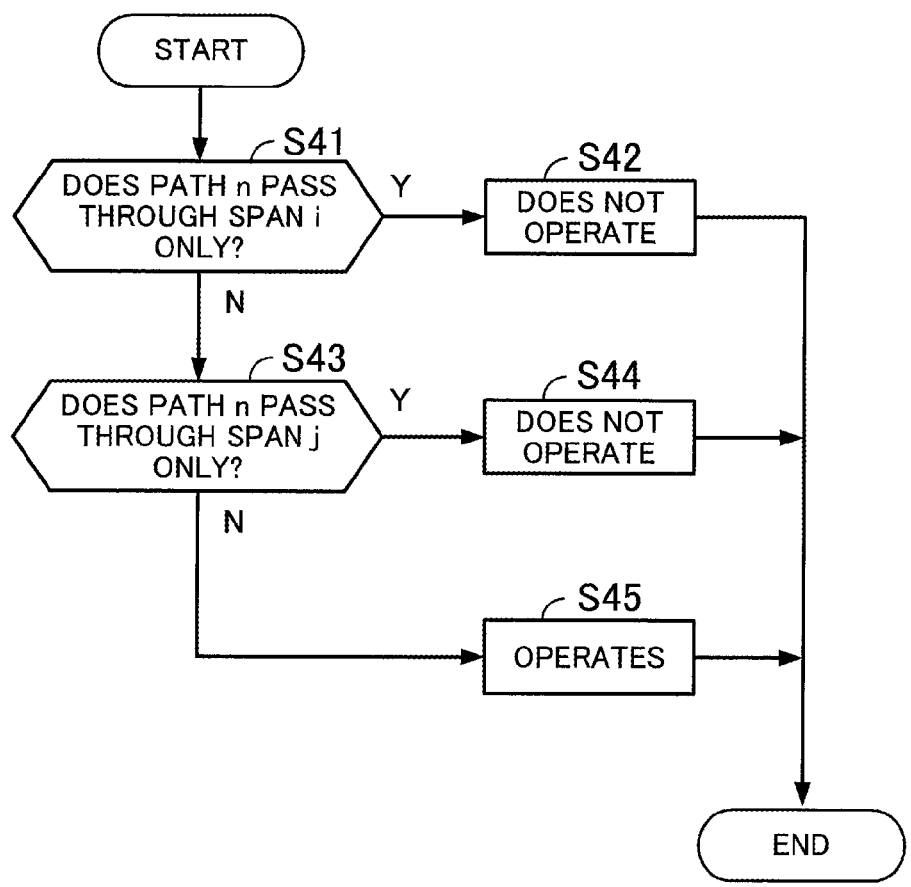
FIG. 17 is a flowchart for determining whether a path normally operates after the ring switching i and j.

FIG. 17 is a flowchart for determining whether a path normally operates after the ring switching i and j. The controller executes the following steps to determine whether a path n normally operates after the ring switching i and j.

(Step S41) The controller determines whether the path n passes through the span i only. If so, the controller advances to step S42. If not, the controller proceeds to step S43.

(Step S42) The controller determines that the path n does not normally operate.

(Step S43) The controller determines whether the path n passes through the span j only. If so, the controller advances to step S44. If not, the controller proceeds to step S45.

(Step S44) The controller determines that the path n does not normally operate.

(Step S45) The controller determines that the path n normally operates.

Figure 18:
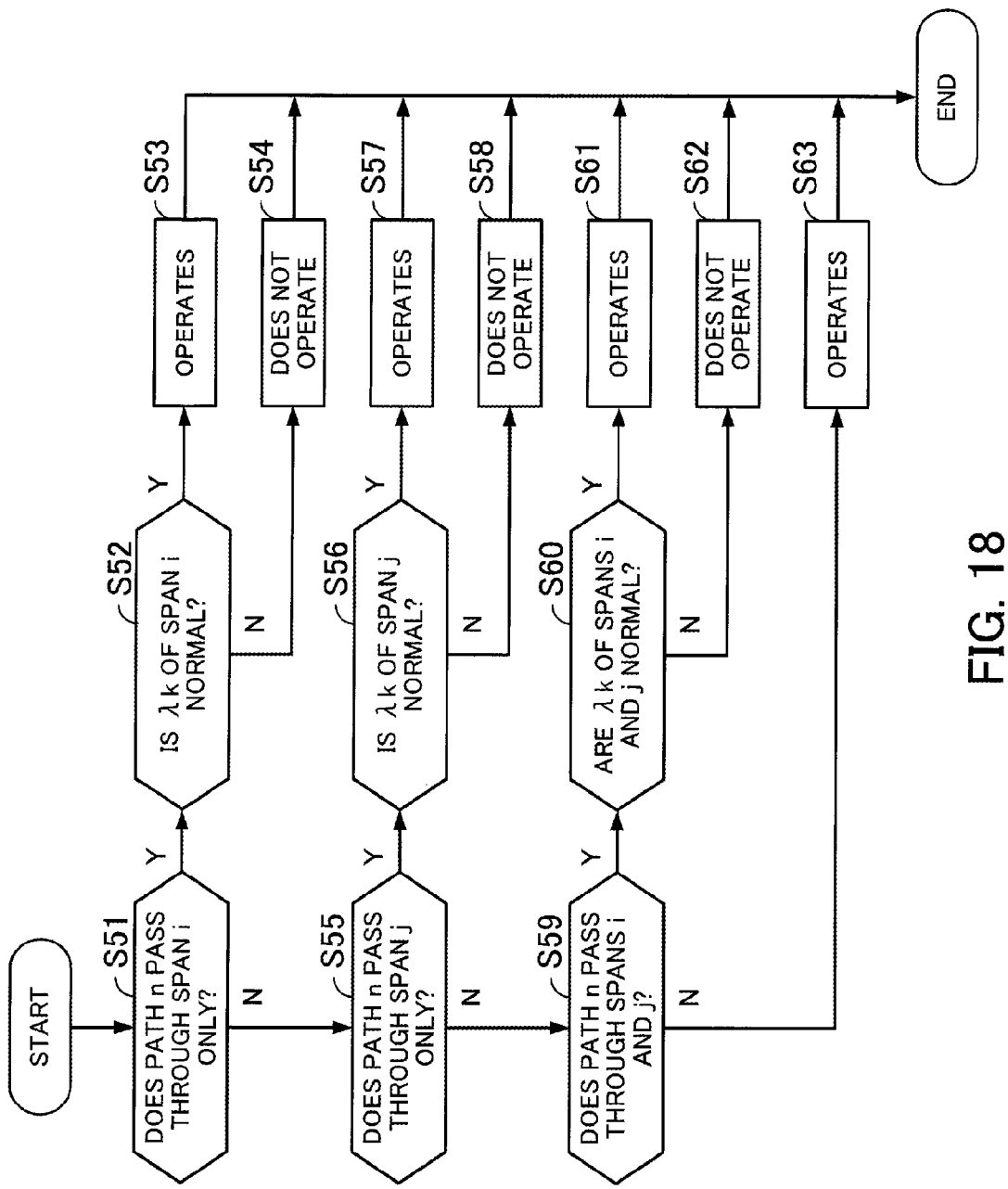
FIG. 18 is a flowchart for determining whether a path normally operates without any ring switching.

FIG. 18 is a flowchart for determining whether a path normally operates without any ring switching. The controller executes the following steps to determine whether a path n normally operates without any ring switching.

(Step S51) The controller determines whether the path n passes through the span i only. If so, the controller advances to step S52. If not, the controller proceeds to step S55.

(Step S52) The controller determines whether the wavelength channel λk of the span i is normal. If so, the controller advances to step S53. If not, the controller proceeds to step S54.

(Step S53) The controller determines that the path n normally operates.

(Step S54) The controller determines that the path n does not normally operate.

(Step S55) The controller determines whether the path n passes through the span j only. If so, the controller advances to step S56. If not, the controller proceeds to step S59.

(Step S56) The controller determines whether the wavelength channel λk of the span j is normal. If so, the controller advances to step S57. If not, the controller proceeds to step S58.

(Step S57) The controller determines that the path n normally operates.

(Step S58) The controller determines that the path n does not normally operate.

(Step S59) The controller determines whether the path n passes through the spans i and j. If so, the controller advances to step S60. If not, the controller proceeds to step S63.

(Step S60) The controller determines whether the wavelength channels λk of the spans i and j are normal. If so, the controller advances to step S61. If not, the controller proceeds to step S62.

(Step S61) The controller determines that the path n normally operates.

(Step S62) The controller determines that the path n does not normally operate.

(Step S63) The controller determines that the path n normally operates.

Transmission of APS information will now be described.

Figure 19:
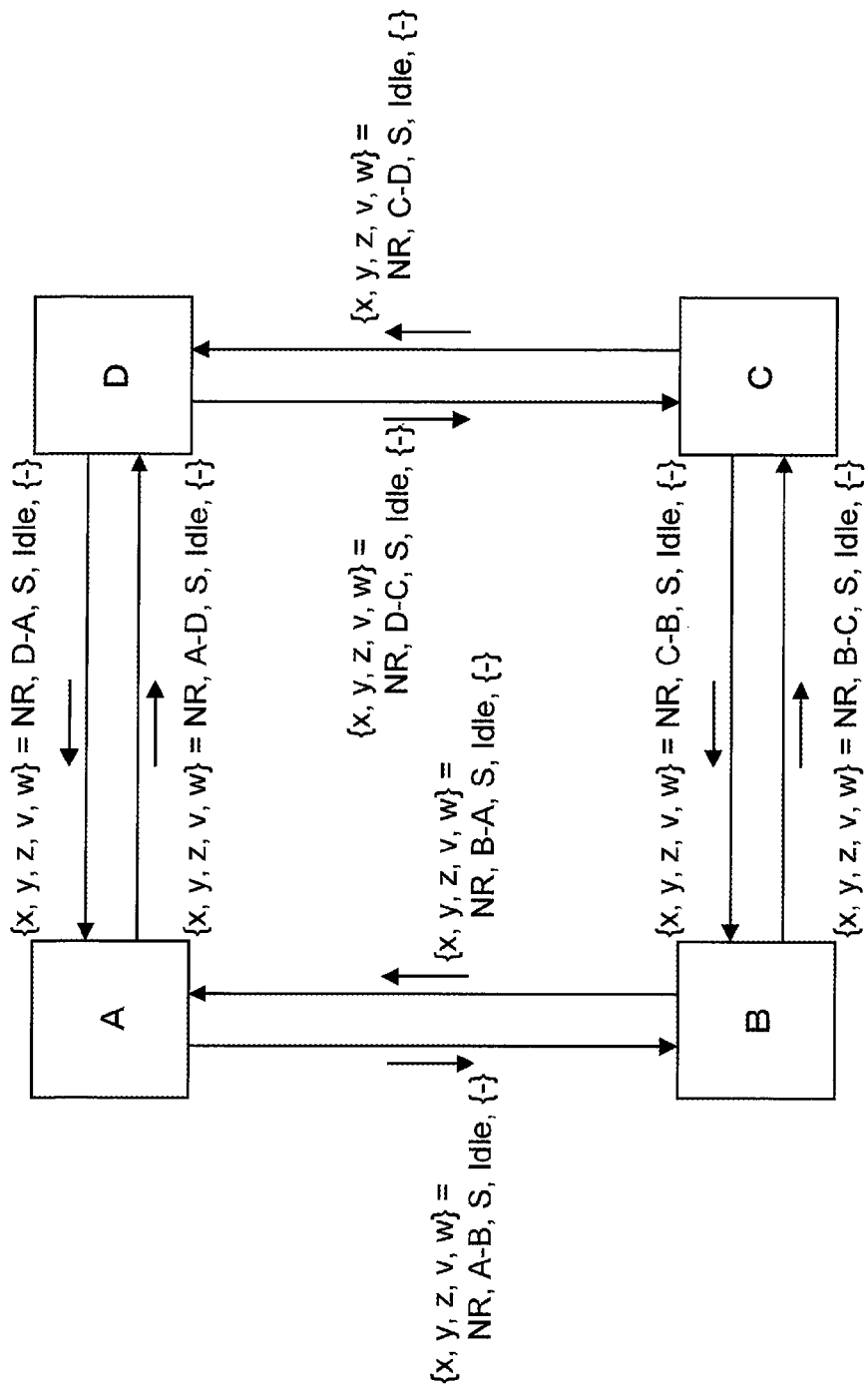
FIG. 19 illustrates how to transmit APS information.

FIG. 19 illustrates how to transmit APS information. The symbols A to D illustrated in FIG. 19 represent nodes. The symbols x, y, z, v, and w illustrated in FIG. 19 represent APS information exchanged between the nodes A to D. Here, the symbol x represents request information. The symbol NR indicates No Request, and represents that the nodes A to D are now in a default state. In other words, the symbol NR represents that there is no fault occurring.

The symbol y represents the source and destination of the APS information. For example, the symbol y of D-A indicates that the APS information is transmitted from the node D to the node A.

The symbol z represents whether the APS information is directly transmitted and received between the nodes A to D, or transmitted and received through other nodes. For example, the symbol y of D-A and the symbol z of S (short) indicate that the APS information is directly transmitted from the node D to the node A. Further, the symbol y of D-A and the symbol z of L (long) indicate that the APS information is transmitted from the node D to the node A through the nodes C and B.

The symbol v represents the status of a node A to D. For example, the symbol v of Idle indicates that the node A to D does not loop back a signal. The symbol v of Br&Sw indicates that the node A to D loops back a signal.

The symbol w represents a wavelength channel in which a fault is occurring. When there is no fault occurring, the symbol w is indicated as {-}. When a fault is occurring, the symbol w represents information of the wavelength channel in which the fault is occurring, for example, as in {λk}.

Suppose hereinafter that one path using the wavelength channel λ1 is set between the nodes A and B, and another path using the wavelength channel λ2 is set between the nodes C and D.

FIG. 19 illustrates an example where there is no fault occurring in a ring network. The nodes A to D each transmit NR to the adjacent nodes A to D. For example, the nodes A to D insert '0000' into a Bridge Request Code of APS information, and transmit the APS information.

Figure 20:
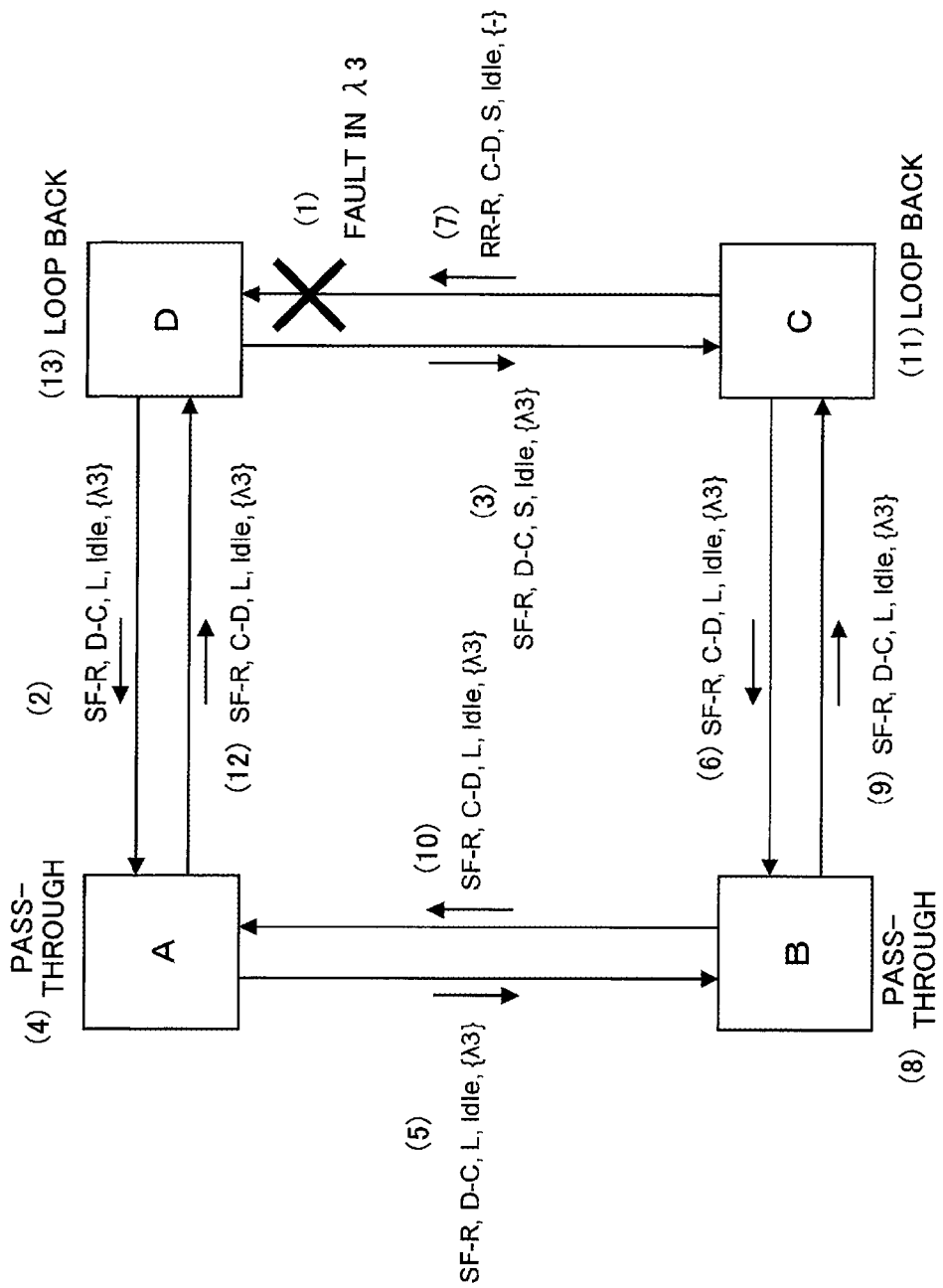
FIG. 20 illustrates how to transmit APS information in the case where a fault occurs.
Figure 21:
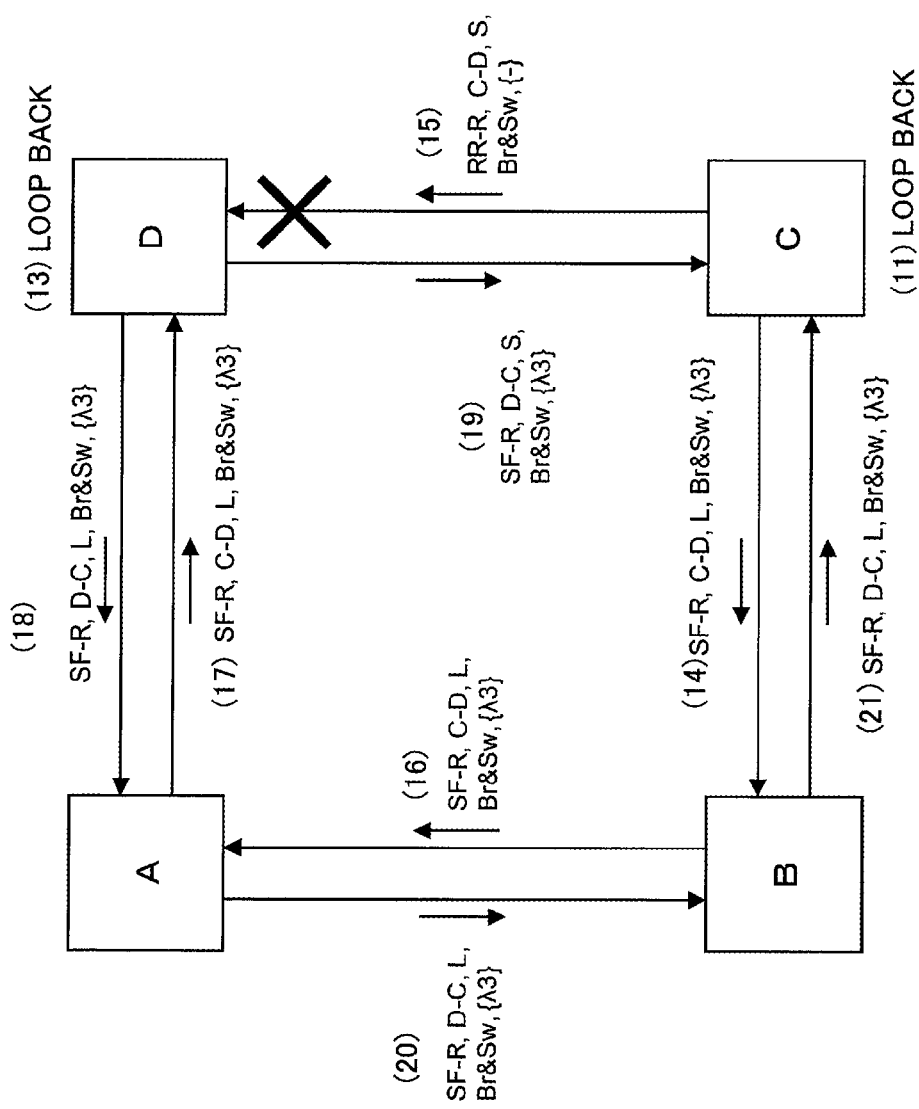
FIG. 21 illustrates how to transmit APS information in the case where a fault occurs.

FIGS. 20 and 21 illustrate how to transmit APS information in the case where a fault occurs. Assume that, as compared to FIG. 19, a fault has occurred in the wavelength channel λ3 in the direction from the node C to the node D (1), as illustrated in FIG. 20.

The node D detects the fault occurring in the wavelength channel λ3, and transmits to the nodes A and C an SF-R (Signal Fail-Ring) addressed to the node C (2, 3). For example, the node D inserts '1011' into the Bridge Request Code of the APS information, and transmits the APS information to the nodes A and C.

The node A receives from the node D the SF-R addressed to the node C (2), and performs pass-through processing (4), thus transmitting it to the node B (5). More specifically, the node A performs a connection process so as to directly transfer a signal received on a spare side to the next node, and directly transfers the received APS information to the next node B.

The node C receives from the node D the SF-R addressed to its own node (3), and transmits to the node B the SF-R addressed to the node D (6), and transmits to the node D an RR-R (Reverse Request-Ring) addressed to the node D (7).

The node B receives from the node A the SF-R addressed to the node C (5), and performs pass-through processing (8), thus directly transmitting the APS information to the node C (9).

The node B receives from the node C the SF-R addressed to the node D (6), and directly transfers the APS information to the node A (10).

The node C receives from the node B the SF-R addressed to its own node (9), and performs a loop back process (11).

The node A receives from the node B the SF-R addressed to the node D (10), and directly transfers the APS information to the node D (12).

The node D receives from the node A the SF-R addressed to its own node (12), and performs a loop back process (13).

After the loop back process (11), the node C changes the status of the APS information to Br&Sw, and transmits the APS information to the nodes B and D (14, 15).

The node B receives from the node C the SF-R addressed to the node D (14), and directly transfers the APS information to the node A (16).

The node A receives from the node B the SF-R addressed to the node D (16), and directly transfers the APS information to the node D (17).

After the loop back process (13), the node D changes the status of the APS information to Br&Sw, and transmits the APS information to the nodes A and C (18, 19).

The node A receives from the node D the SF-R addressed to the node C (18), and directly transfers the APS information to the node B (20).

The node B receives from the node A the SF-R addressed to the node C (20), and directly transfers the APS information to the node C (21).

Figure 22:
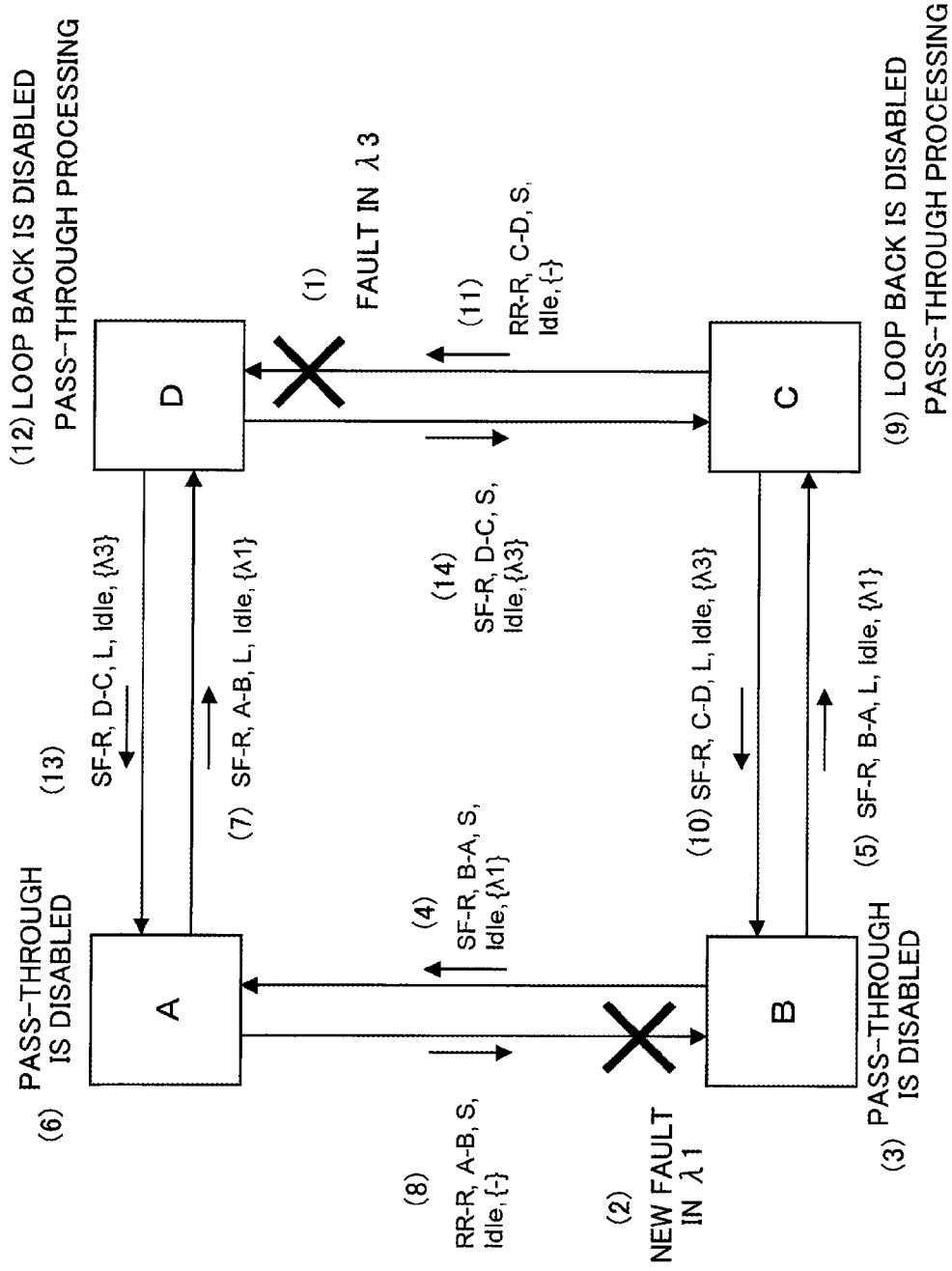
FIG. 22 illustrates how to transmit APS information in the case where a fault newly occurs in the state of FIG. 21.
Figure 23:
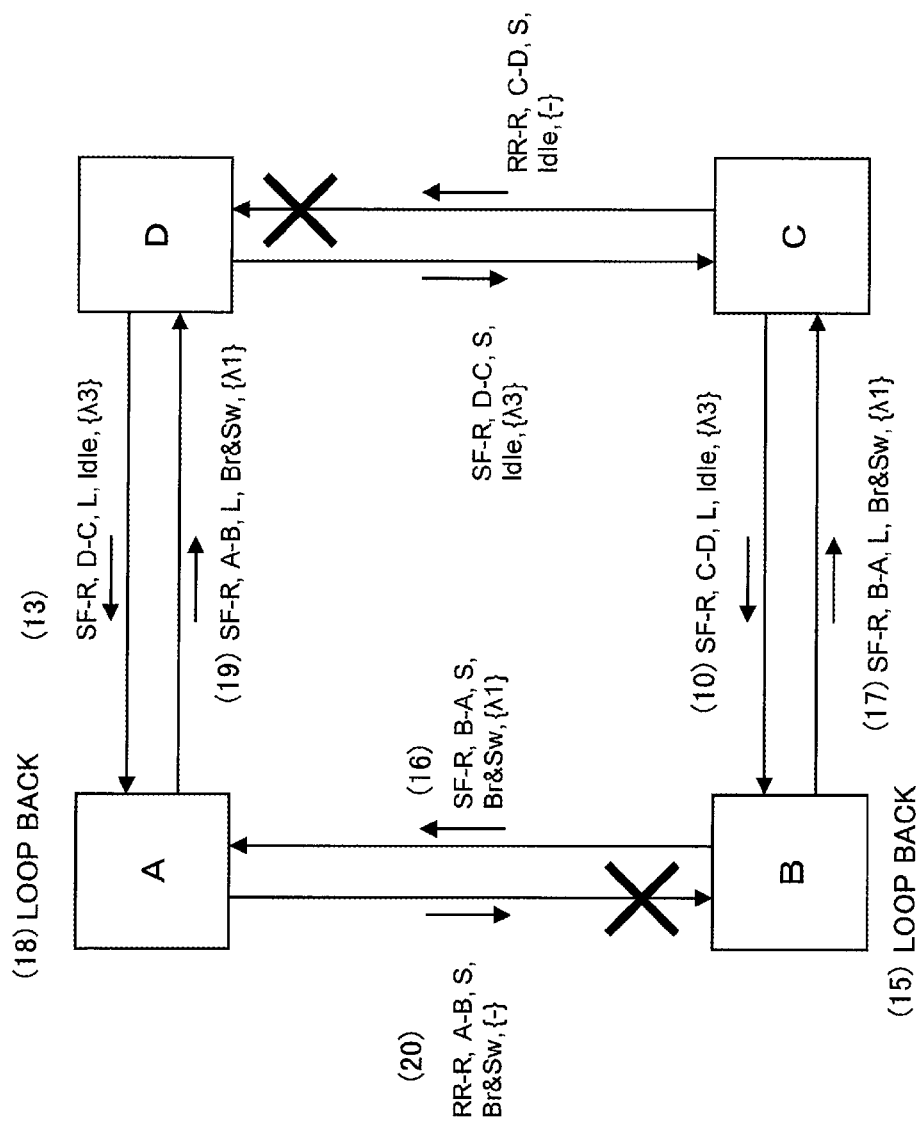
FIG. 23 illustrates how to transmit APS information in the case where a fault newly occurs in the state of FIG. 21.

FIGS. 22 and 23 illustrate how to transmit APS information in the case where a new fault has occurred in the state of FIG. 21. In FIGS. 22 and 23, a new fault is occurring in the wavelength channel λ1 between the nodes A and B.

The node B detects the fault occurring in the wavelength channel λ1, and recognizes multiple faults. As described with reference to FIGS. 14 to 18, the node B calculates the number of operating paths. As a result, the node B determines to perform switching by its own node and disables the pass-through (3). Also, the other nodes A, C, and D calculate the number of operating paths as well.

The node B transmits to the nodes A and C an SF-R addressed to the node A (4, 5).

The node A receives from the node B the SF-R addressed to its own node (4), and recognizes the multiple faults. As a result of calculating the number of operating paths, the node A determines to perform switching by its own node, and disables the pass-through (6).

The node A transmits to the node D the SF-R addressed to the node B (7), and transmits to the node B an RR-R addressed to the node B (8).

The node C receives from the node B the SF-R addressed to the node A (5), and recognizes the multiple faults. As a result of calculating the number of operating paths, the node C determines not to perform switching by its own node, and disables the loop back, thus performing the pass-through processing (9).

The node C changes the status of the APS information to Idle, and transmits the APS information to the nodes B and D (10, 11).

The node D receives from the node A the SF-R addressed to the node B (7), and recognizes the multiple faults. As a result of calculating the number of operating paths, the node D determines not to perform switching by its own node, and disables the loop back, thus performing the pass-through processing (12).

More specifically, when determining that the route switching of the path does not need to be performed by its own node while performing the path switching, the node D disables the switching. Further, when determining that the node B switches the route of the path, the node D disables the switching, and then performs the pass-through processing.

The node D changes the status of the APS information to Idle, and transmits the APS information to the nodes A and C (13, 14).

The node B receives from the node C the SF-R having a status of Idle (10), and performs the loop back processing (15).

The node B changes the status of the APS information to Br&Sw, and transmits the APS information to the nodes A and C (16, 17).

The node A receives from the node D the SF-R having a status of Idle (13), and performs the loop back processing (18).

The node A changes the status of the APS information to Br&Sw, and transmits the APS information to the nodes D and B (19, 20).

As described above, the controller of a node performs route switching of a path when determining that the number of operating paths is maximized by performing the route switching of the path in the node. This technique keeps using as many operating paths as possible.

Third Embodiment

A third embodiment will be described in detail below with reference to the drawings. In the third embodiment, a 4-fiber BLSR network will be described by way of example.

Figure 24:
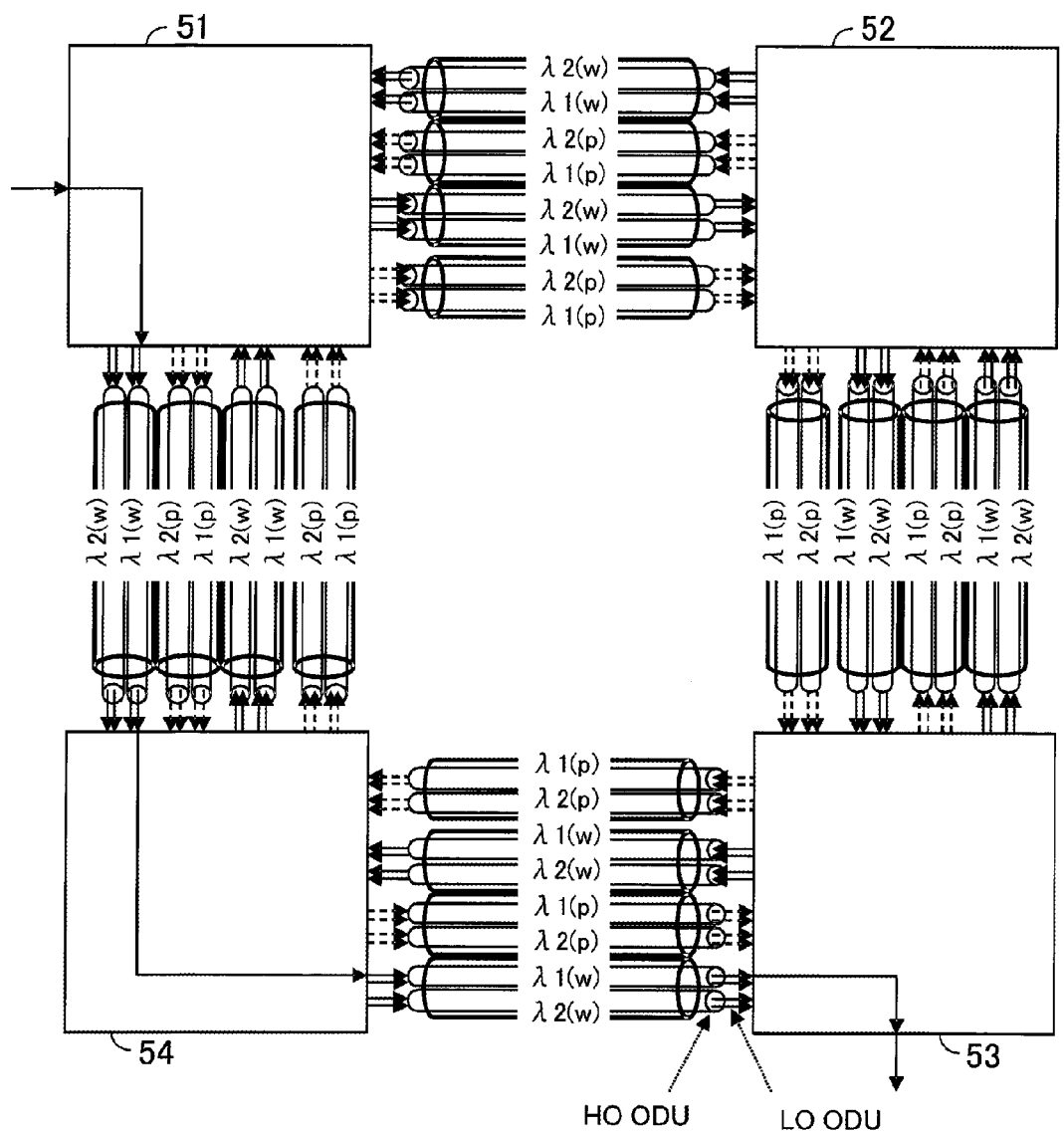
FIG. 24 illustrates an example of an optical network system according to a third embodiment.

FIG. 24 illustrates an example of an optical network system according to the third embodiment. FIG. 24 illustrates a 4-fiber BLSR ring network by way of example.

Nodes 51 to 54 are connected through four fibers. Out of the four fibers, two fibers are used to transmit an optical signal in the clockwise direction and the other two fibers are used to transmit an optical signal in the counterclockwise direction.

Each fiber has a plurality of wavelength channels λ1 and λ2. Each of the wavelength channels λ1 and λ2 corresponds to one HO ODU. Each HO ODU path is terminated between adjacent nodes.

Each HO ODU includes a plurality of LO ODUs. For example, the nodes 51 to 54 use working LO ODUs to provide LO paths. The nodes 51 to 54 use two wavelength channels for each of uplink and downlink in each span, thereby configuring a 4-fiber BLSR ring network. In each direction, one wavelength channel is used as a working wavelength channel, and the other wavelength channel is used as a spare wavelength channel.

In the example of FIG. 24, the nodes 51 to 54 configure a ring network by using the same-wavelength channels of the fibers. In the ring network of FIG. 24, span switching and ring switching are realized in the same manner as in the 4-fiber BLSR. Arrows illustrated in FIG. 24 indicate a path through the nodes 51, 54, and 53.

Figure 25:
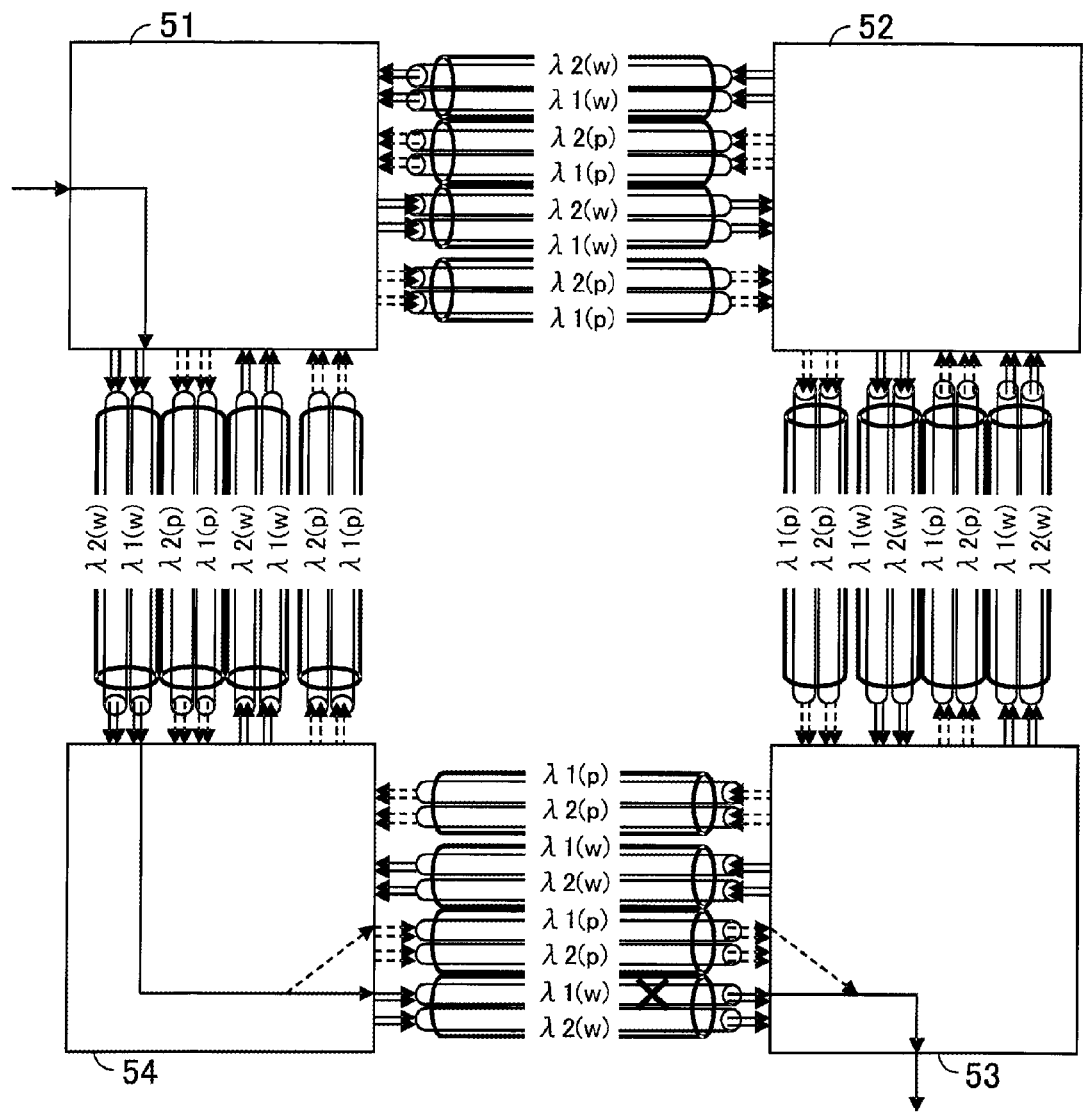
FIG. 25 illustrates span switching.

FIG. 25 illustrates span switching. In FIG. 25, the same reference numerals as those of FIG. 24 are given to the same circuit elements. Referring to FIG. 25, in a span between the nodes 54 and 53, a fault has occurred in the working wavelength channel λ1 in the counterclockwise direction.

In the 4-fiber BLSR, fault recovery is performed by performing path switching to a spare wavelength channel in the same direction in the span where the fault is occurring. As indicated in dotted line arrows of FIG. 25, for example, the fault recovery in the working wavelength channel λ1 is performed by performing the path switching from the working wavelength channel λ1 to the spare wavelength channel λ1.

Figure 26:
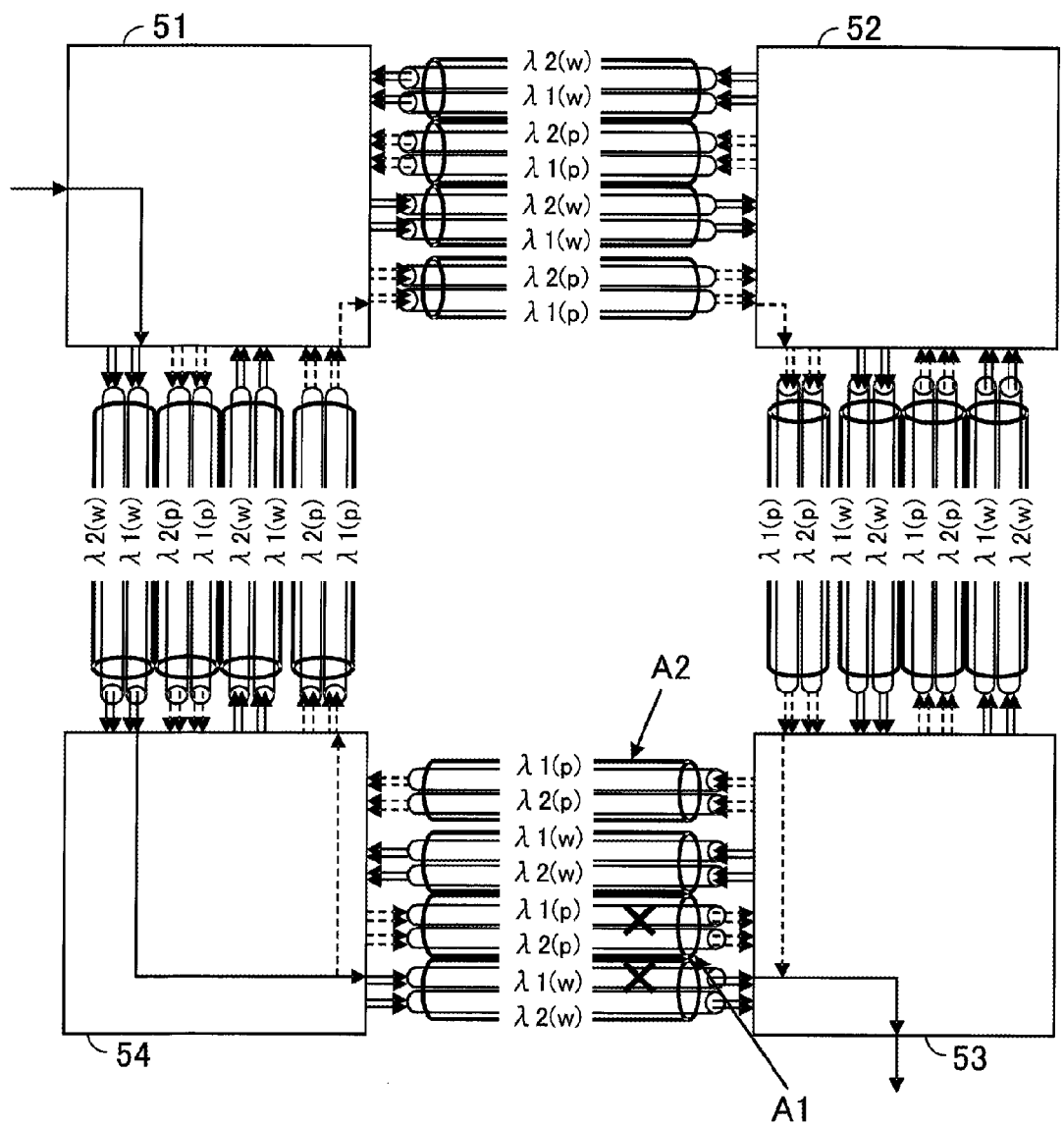
FIG. 26 illustrates ring switching.

FIG. 26 illustrates ring switching. In FIG. 26, the same reference numerals as those of FIG. 24 are given to the same circuit elements. In FIG. 26, in a span between the nodes 54 and 53, faults have occurred in the working and spare wavelength channels λ1 in the counterclockwise direction.

As illustrated in FIG. 26, when faults occur in both of the working and spare wavelength channels, the ring switching is performed in the 4-fiber BLSR. As indicated in dotted line arrows of FIG. 26, for example, the nodes 54 and 53 perform ring switching for fault recovery.

As described above, it is possible to configure a plurality of rings as in 4-fiber BLSR for each wavelength channel, and to operate the rings independently of each other. However, a processing load becomes larger in the case where more wavelengths are multiplexed. Therefore, to reduce the load, a plurality of wavelength channels may be grouped, and when a fault occurs in a part of wavelength channels in a group, ring switching may be collectively performed within the group.

Figure 27:
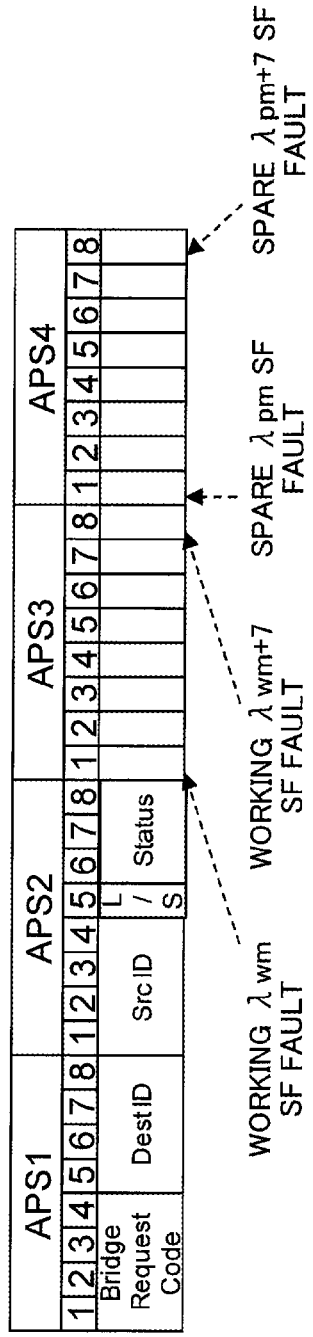
FIG. 27 illustrates an example of APS information.

FIG. 27 illustrates an example of APS information. The APS information used for configuring a 4-fiber BLSR network is different from that used for configuring a 2-fiber BLSR network. As compared to the APS information illustrated in FIG. 6, for example, fault information on a working wavelength channel and that on a spare wavelength channel are stored in the third and fourth bytes of the APS information used for configuring a 4-fiber BLSR network. When there are many wavelength channels in a group, many pieces of fault wavelength information may be transferred by using a plurality of frames as in FIG. 7.

Figure 28:
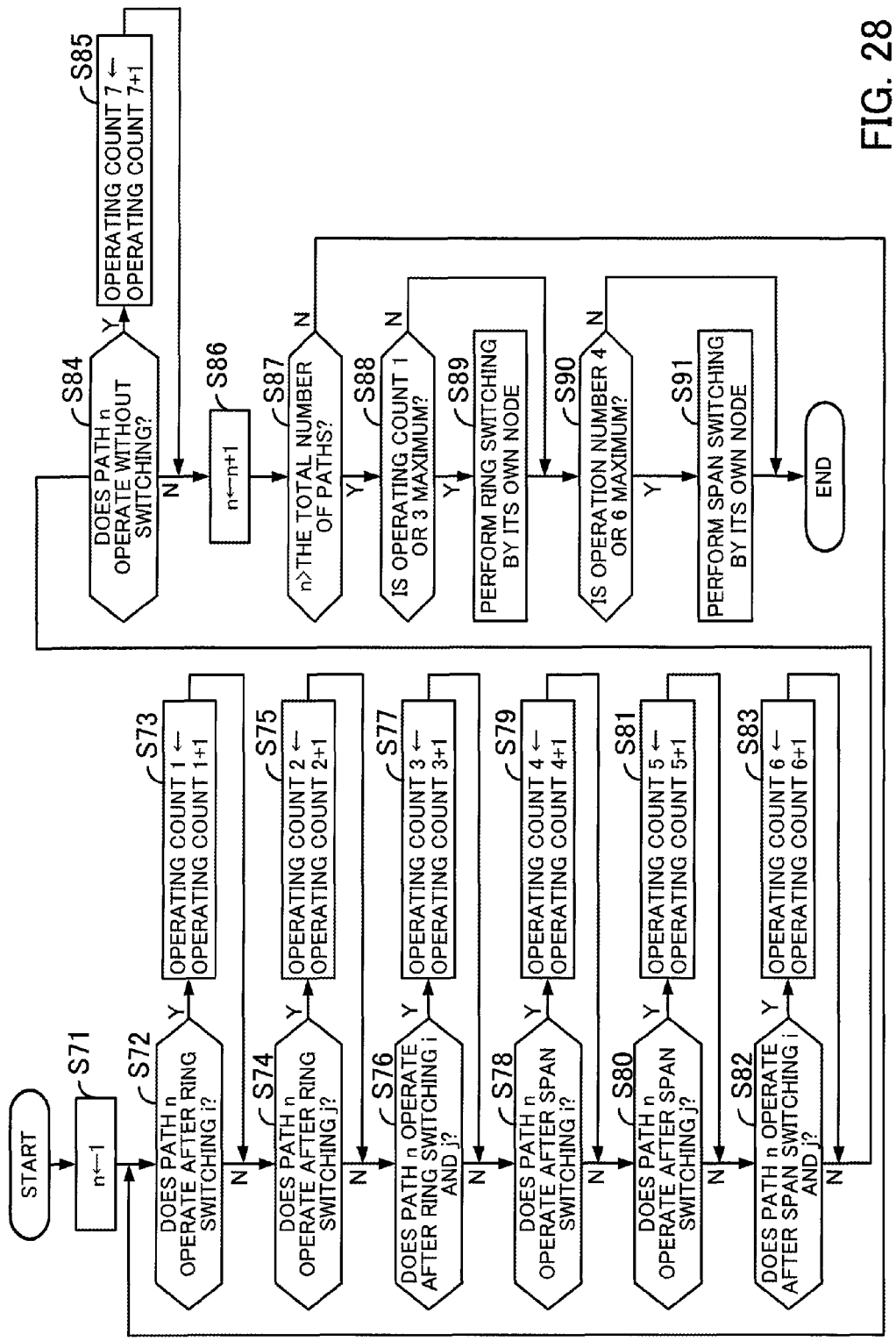
FIG. 28 is a flowchart illustrating how to calculate the number of operating paths.

FIG. 28 is a flowchart illustrating how to calculate the number of operating paths. Ring switching i represents that loop-back is performed in both end nodes of a span i. Span switching i represents that span switching is performed in both end nodes of the span i. The span i represents a span related to an own node.

Ring switching j represents that the loop-back is performed in both end nodes of a span j. Span switching j represents that the span switching is performed in both end nodes of the span j. The span j represents a span not related to an own node.

The following describes how the node 51 operates. The other nodes 52 to 54 also perform the same operations. In addition, the node 51 has the same functional blocks as those of FIG. 3, but is different in functions of the controller.

(Step S71) The controller of the node 51 substitutes 1 for a variable n.

(Step S72) The controller determines whether a path n operates after the ring switching i. If so, the controller advances to step S73. If not, the controller proceeds to step S74.

(Step S73) The controller adds 1 to a variable 'operating count 1'.

(Step S74) The controller determines whether the path n operates after the ring switching j. If so, the controller advances to step S75. If not, the controller proceeds to step S76.

(Step S75) The controller adds 1 to a variable 'operating count 2'.

(Step S76) The controller determines whether the path n operates after the ring switching i and j. If so, the controller advances to step S77. If not, the controller proceeds to step S78.

(Step S77) The controller adds 1 to a variable 'operating count 3'.

(Step S78) The controller determines whether the path n operates after the span switching i. If so, the controller advances to step S79. If not, the controller proceeds to step S80.

(Step S79) The controller adds 1 to a variable 'operating count 4'.

(Step S80) The controller determines whether the path n operates after the span switching j. If so, the controller advances to step S81. If not, the controller proceeds to step S82.

(Step S81) The controller adds 1 to a variable 'operating count 5'.

(Step S82) The controller determines whether the path n operates after the span switching i and j. If so, the controller advances to step S83. If not, the controller proceeds to step S84.

(Step S83) The controller adds 1 to a variable 'operating count 6'.

(Step S84) The controller determines whether the path n operates without the ring switching and the span switching. If so, the controller advances to step S85. If not, the controller proceeds to step S86.

(Step S85) The controller adds 1 to a variable 'operating count 7'.

(Step S86) The controller adds 1 to the variable n.

(Step S87) The controller determines whether the variable n is greater than the total number of paths. If not, the controller returns to step S72. If so, the controller proceeds to step S88.

(Step S88) The controller determines whether the variable 'operating count 1' or 'operating count 3' is the maximum. Specifically, the controller determines whether the number of normally operating paths is maximized by performing the ring switching i related to its own node. If so, the controller advances to step S89 to perform ring switching by its own node (node 51). If not, the controller proceeds to step S90.

(Step S89) The controller performs the ring switching by its own node.

(Step S90) The controller determines whether the variable 'operating count 4' or 'operating count 6' is the maximum. Specifically, the controller determines whether the number of normally operating paths is maximized by performing the span switching i related to its own node. If so, the controller advances to step S91 to perform span switching by its own node. If not, the controller ends the process.

(Step S91) The controller performs the span switching by its own node.

In the above-described process, as a result of counting the number of normally operating paths with respect to all of the paths, some cases may have the same maximum number of paths. In this case, one case is determined by applying a certain rule. For example, a priority is determined by combining an order of span switching and ring switching and an ascending order of the number of ring switching portions, such as an order of "no switching", "span switching i" or "span switching j", "span switching i and j", "ring switching i" or "ring switching j", and "ring switching i and j".

If the "span switching i" and the "span switching j" have the same maximum number of paths, or the "ring switching i" and the "ring switching j" have the same maximum number of paths, the IDs of the both end nodes of the spans are compared, thereby determining the priority. For example, if the end nodes of the span i have the IDs of 1 and 3, and the end nodes of the span j have the IDs of 2 and 4, the span switching or the ring switching is performed in the span i having the smallest ID. If the end nodes of the span i have the IDs of 1 and 3, and the end nodes of the span j have the IDs of 1 and 2, the span switching or the ring switching is performed in the span j having the second smallest ID.

Figure 29:
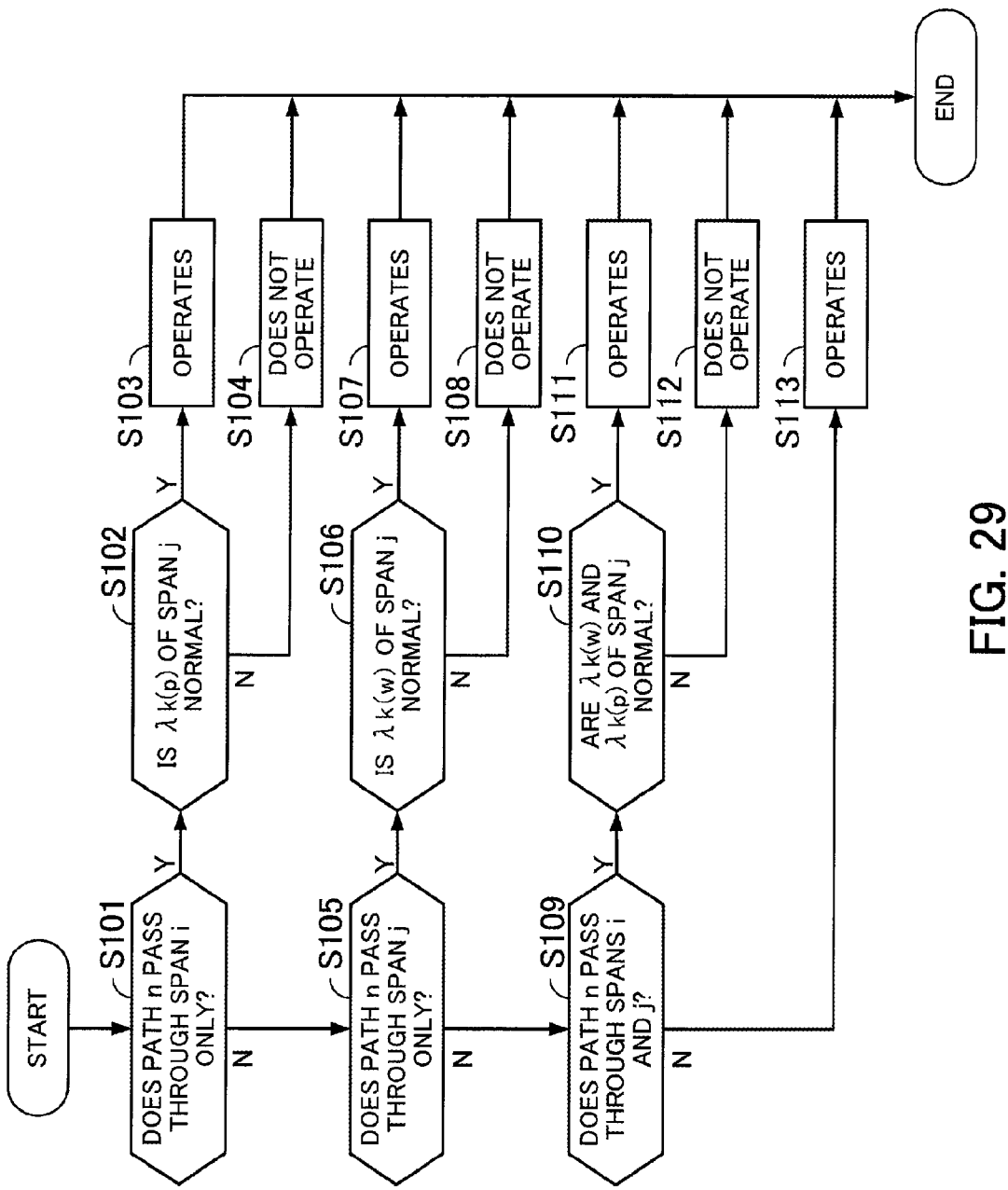
FIG. 29 is a flowchart for determining whether a path normally operates after ring switching i.

FIG. 29 is a flowchart for determining whether a path normally operates after ring switching i. Hereinafter, the wavelength channel $\lambda k(w)$ indicates a working wavelength channel. The wavelength channel $\lambda k(p)$ indicates a spare wavelength channel. The controller executes the following steps to determine whether a path n normally operates after the ring switching i.

(Step S101) The controller determines whether the path n passes through the span i only. If so, the controller advances to step S102. If not, the controller proceeds to step S105.

(Step S102) The controller determines whether the wavelength channel $\lambda k(p)$ of the span j is normal. If so, the controller advances to step S103. If not, the controller proceeds to step S104.

(Step S103) The controller determines that the path n normally operates.

(Step S104) The controller determines that the path n does not normally operate.

(Step S105) The controller determines whether the path n passes through the span j only. If so, the controller advances to step S106. If not, the controller proceeds to step S109.

(Step S106) The controller determines whether the wavelength channel $\lambda k(w)$ of the span j is normal. If so, the controller advances to step S107. If not, the controller proceeds to step S108.

(Step S107) The controller determines that the path n normally operates.

(Step S108) The controller determines that the path n does not normally operate.

(Step S109) The controller determines whether the path n passes through the spans i and j. If so, the controller advances to step S110. If not, the controller proceeds to step S113.

(Step S110) The controller determines whether the wavelength channels $\lambda k(w)$ and $\lambda k(p)$ of the span j are normal. If so, the controller advances to step S111. If not, the controller proceeds to step S112.

(Step S111) The controller determines that the path n normally operates.

(Step S112) The controller determines that the path n does not normally operate.

(Step S113) The controller determines that the path n normally operates.

Figure 30:
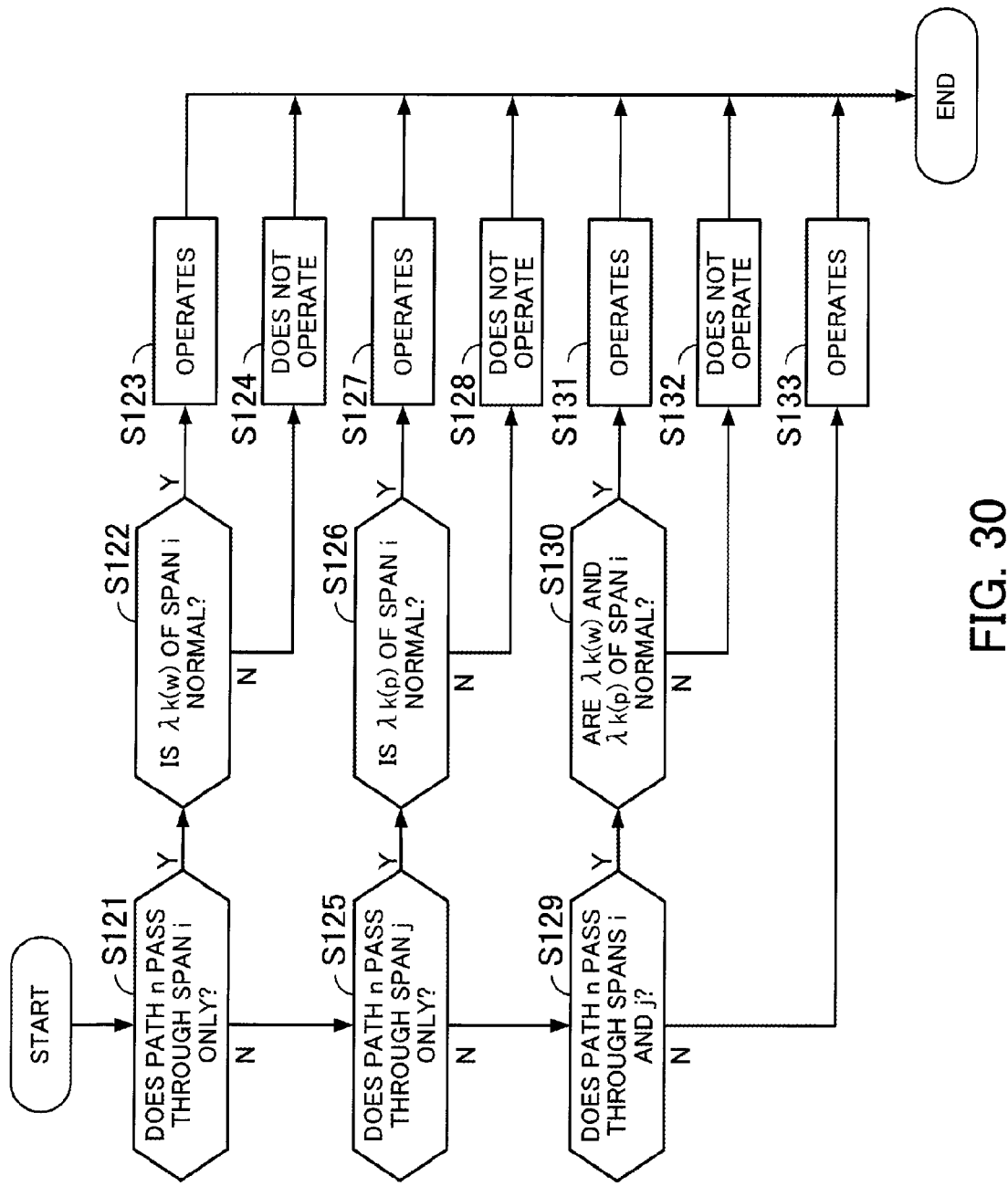
FIG. 30 is a flowchart for determining whether a path normally operates after the ring switching j.

FIG. 30 is a flowchart for determining whether a path normally operates after the ring switching j. The controller executes the following steps to determine whether a path n normally operates after the ring switching j.

(Step S121) The controller determines whether the path n passes through the span i only. If so, the controller advances to step S122. If not, the controller proceeds to step S125.

(Step S122) The controller determines whether the wavelength channel $\lambda k(w)$ of the span i is normal. If so, the controller advances to step S123. If not, the controller proceeds to step S124.

(Step S123) The controller determines that the path n normally operates.

(Step S124) The controller determines that the path n does not normally operate.

(Step S125) The controller determines whether the path n passes through the span j only. If so, the controller advances to step S126. If not, the controller proceeds to step S129.

(Step S126) The controller determines whether the wavelength channel $\lambda k(p)$ of the span i is normal. If so, the controller advances to step S127. If not, the controller proceeds to step S128.

(Step S127) The controller determines that the path n normally operates.

(Step S128) The controller determines that the path n does not normally operate.

(Step S129) The controller determines whether the path n passes through the spans i and j. If so, the controller advances to step S130. If not, the controller proceeds to step S133.

(Step S130) The controller determines whether the wavelength channels $\lambda k(w)$ and $\lambda k(p)$ of the span i are normal. If so, the controller advances to step S131. If not, the controller proceeds to step S132.

(Step S131) The controller determines that the path n normally operates.

(Step S132) The controller determines that the path n does not normally operate.

(Step S133) The controller determines that the path n normally operates.

Figure 31:
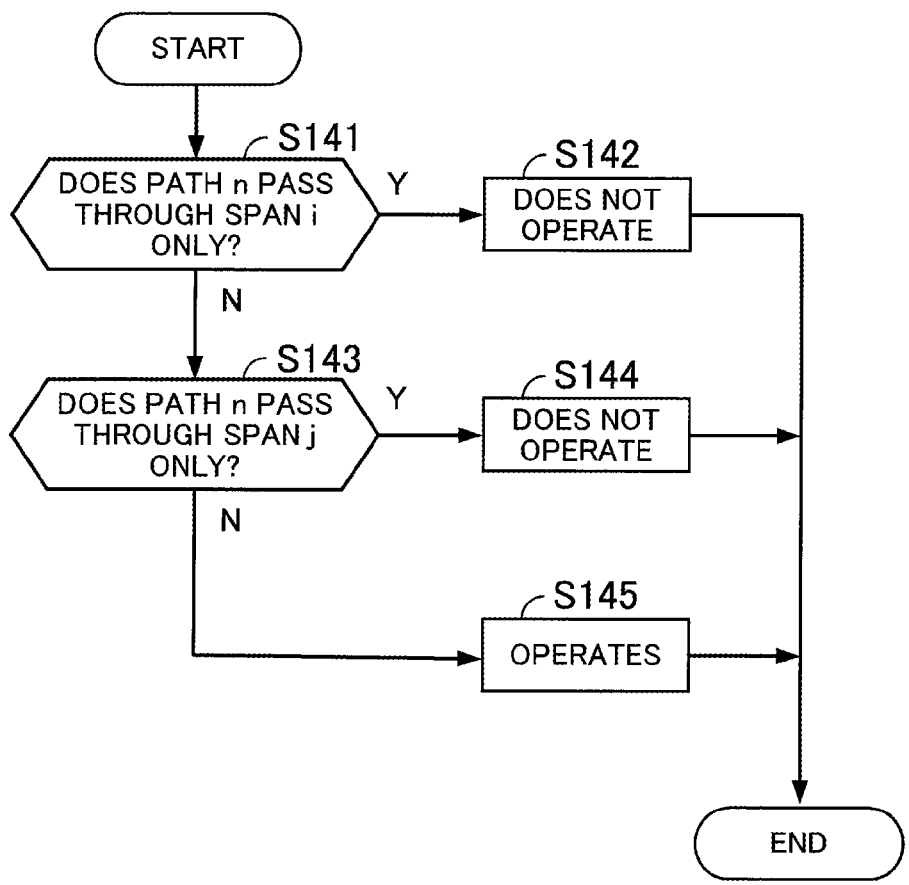
FIG. 31 is a flowchart for determining whether a path normally operates after the ring switching i and j.

FIG. 31 is a flowchart for determining whether a path normally operates after the ring switching i and j. The controller executes the following steps to determine whether a path n normally operates after the ring switching i and j.

(Step S141) The controller determines whether the path n passes through the span i only. If so, the controller advances to step S142. If not, the controller proceeds to step S143.

(Step S142) The controller determines that the path n does not normally operate.

(Step S143) The controller determines whether the path n passes through the span j only. If so, the controller advances to step S144. If not, the controller proceeds to step S145.

(Step S144) The controller determines that the path n does not normally operate.

(Step S145) The controller determines that the path n normally operates.

Figure 32:
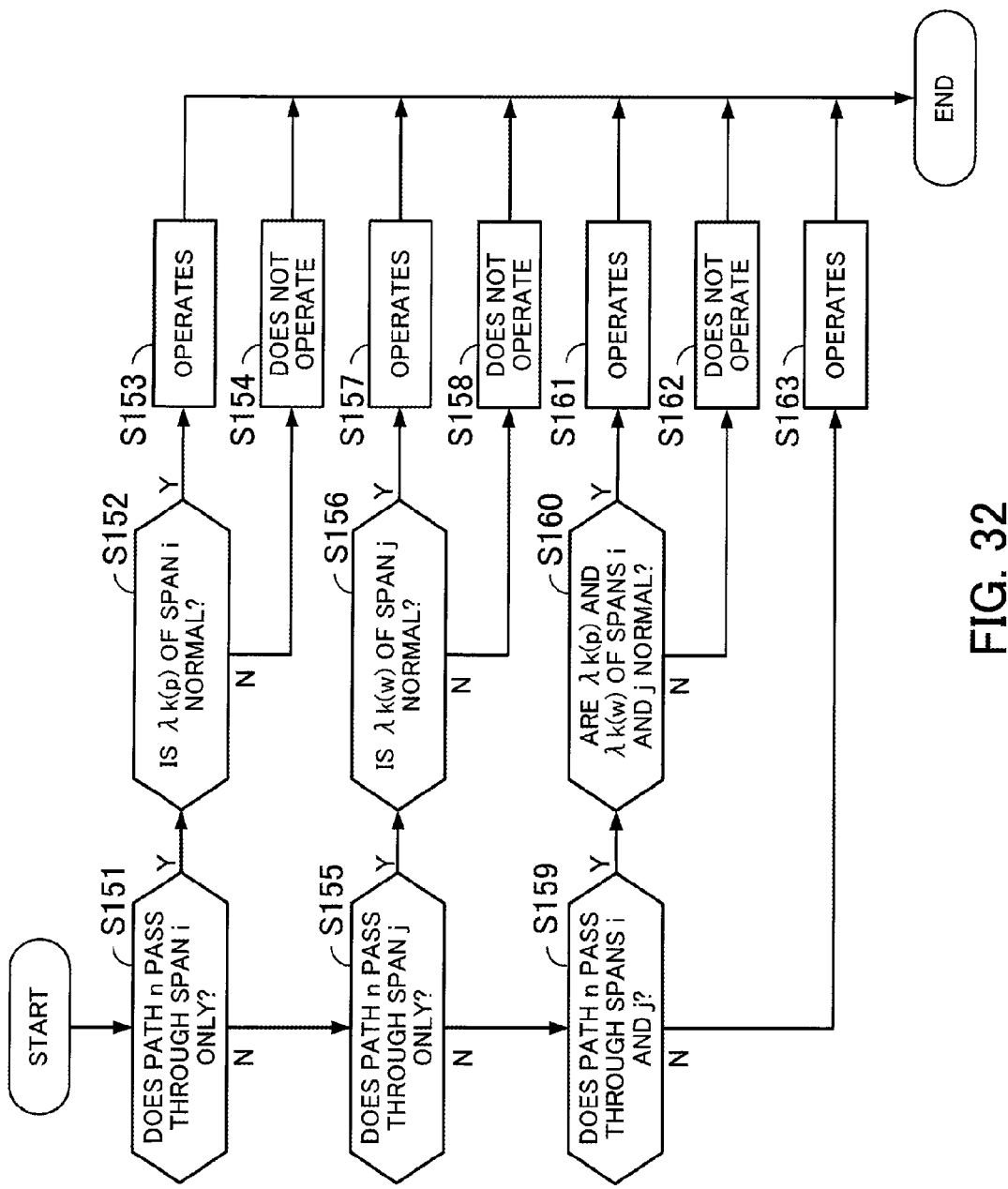
FIG. 32 is a flowchart for determining whether a path normally operates after the span switching i.

FIG. 32 is a flowchart for determining whether a path normally operates after the span switching i. The controller executes the following steps to determine whether a path n normally operates after the span switching i.

(Step S151) The controller determines whether the path n passes through the span i only. If so, the controller advances to step S152. If not, the controller proceeds to step S155.

(Step S152) The controller determines whether the wavelength channel $\lambda k(p)$ of the span i is normal. If so, the controller advances to step S153. If not, the controller proceeds to step S154.

(Step S153) The controller determines that the path n normally operates.

(Step S154) The controller determines that the path n does not normally operate.

(Step S155) The controller determines whether the path n passes through the span j only. If so, the controller advances to step S156. If not, the controller proceeds to step S159.

(Step S156) The controller determines whether the wavelength channel λk(w) of the span j is normal. If so, the controller advances to step S157. If not, the controller proceeds to step S158.

(Step S157) The controller determines that the path n normally operates.

(Step S158) The controller determines that the path n does not normally operate.

(Step S159) The controller determines whether the path n passes through the spans i and j. If so, the controller advances to step S160. If not, the controller proceeds to step S163.

(Step S160) The controller determines whether the wavelength channel λk(p) of the span i and the wavelength channel λk(w) of the span j are normal. If so, the controller advances to step S161. If not, the controller proceeds to step S162.

(Step S161) The controller determines that the path n normally operates.

(Step S162) The controller determines that the path n does not normally operate.

(Step S163) The controller determines that the path n normally operates.

Figure 33:
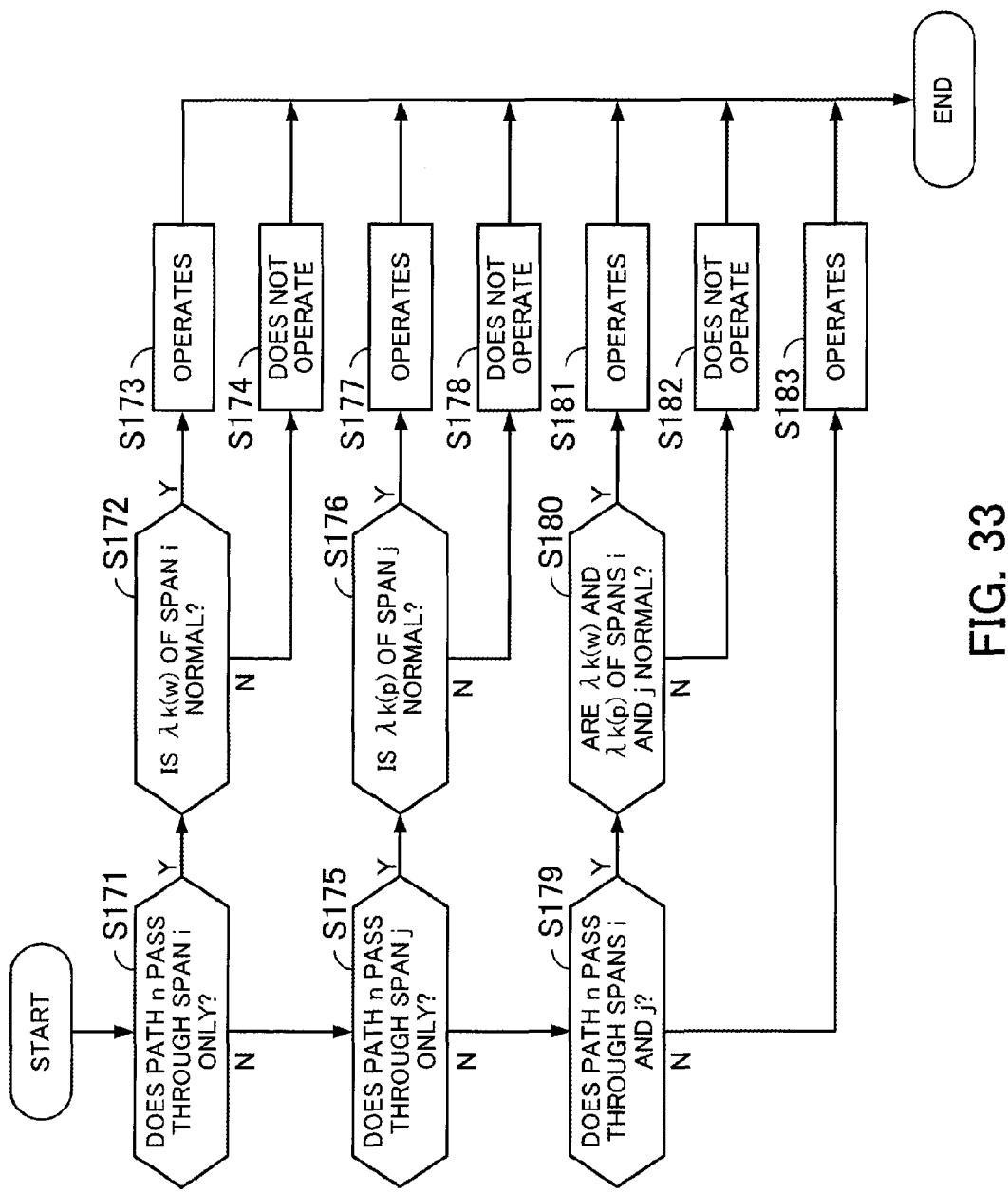
FIG. 33 is a flowchart for determining whether a path normally operates after the span switching j.

FIG. 33 is a flowchart for determining whether a path normally operates after the span switching j. The controller executes the following steps to determine whether a path n normally operates after the span switching j.

(Step S171) The controller determines whether the path n passes through the span i only. If so, the controller advances to step S172. If not, the controller proceeds to step S175.

(Step S172) The controller determines whether the wavelength channel λk(w) of the span i is normal. If so, the controller advances to step S173. If not, the controller proceeds to step S174.

(Step S173) The controller determines that the path n normally operates.

(Step S174) The controller determines that the path n does not normally operate.

(Step S175) The controller determines whether the path n passes through the span j only. If so, the controller advances to step S176. If not, the controller proceeds to step S179.

(Step S176) The controller determines whether the wavelength channel λk(p) of the span j is normal. If so, the controller advances to step S177. If not, the controller proceeds to step S178.

(Step S177) The controller determines that the path n normally operates.

(Step S178) The controller determines that the path n does not normally operate.

(Step S179) The controller determines whether the path n passes through the spans i and j. If so, the controller advances to step S180. If not, the controller proceeds to step S183.

(Step S180) The controller determines whether the wavelength channel λk(w) of the span i and the wavelength channel λk(p) of the span j are normal. If so, the controller advances to step S181. If not, the controller proceeds to step S182.

(Step S181) The controller determines that the path n normally operates.

(Step S182) The controller determines that the path n does not normally operate.

(Step S183) The controller determines that the path n normally operates.

Figure 34:
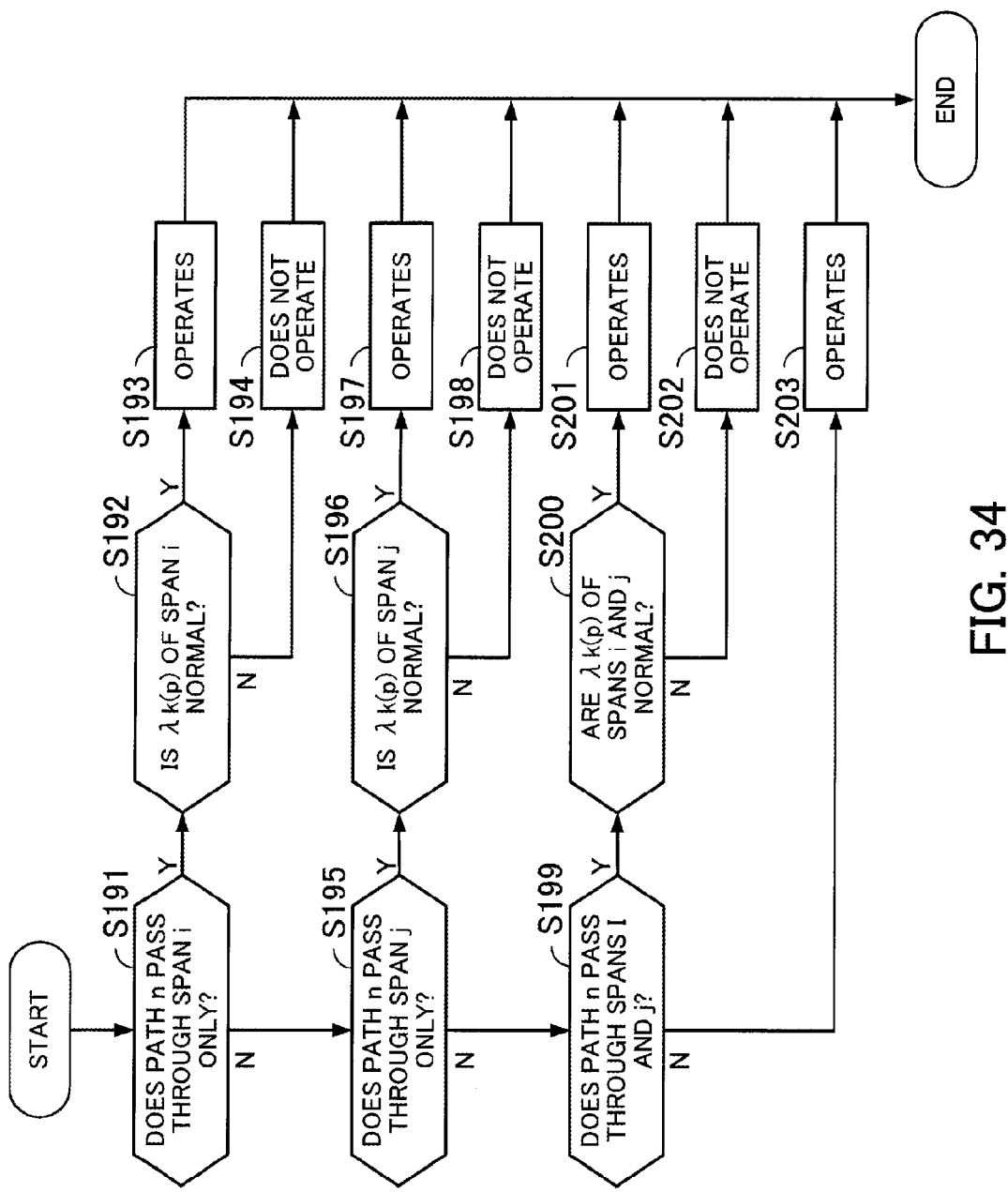
FIG. 34 is a flowchart for determining whether a path normally operates after the span switching i and j.

FIG. 34 is a flowchart for determining whether a path normally operates after the span switching i and j. The controller executes the following steps to determine whether a path n normally operates after the span switching i and j.

(Step S191) The controller determines whether the path n passes through the span i only. If so, the controller advances to step S192. If not, the controller proceeds to step S195.

(Step S192) The controller determines whether the wavelength channel λk(p) of the span i is normal. If so, the controller advances to step S193. If not, the controller proceeds to step S194.

(Step S193) The controller determines that the path n normally operates.

(Step S194) The controller determines that the path n does not normally operate.

(Step S195) The controller determines whether the path n passes through the span j only. If so, the controller advances to step S196. If not, the controller proceeds to step S199.

(Step S196) The controller determines whether the wavelength channel λk(p) of the span j is normal. If so, the controller advances to step S197. If not, the controller proceeds to step S198.

(Step S197) The controller determines that the path n normally operates.

(Step S198) The controller determines that the path n does not normally operate.

(Step S199) The controller determines whether the path n passes through the spans i and j. If so, the controller advances to step S200. If not, the controller proceeds to step S203.

(Step S200) The controller determines whether the wavelength channel λk(p) of the span i and the wavelength channel λk(p) of the span j are normal. If so, the controller advances to step S201. If not, the controller proceeds to step S202.

(Step S201) The controller determines that the path n normally operates.

(Step S202) The controller determines that the path n does not normally operate.

(Step S203) The controller determines that the path n normally operates.

Figure 35:
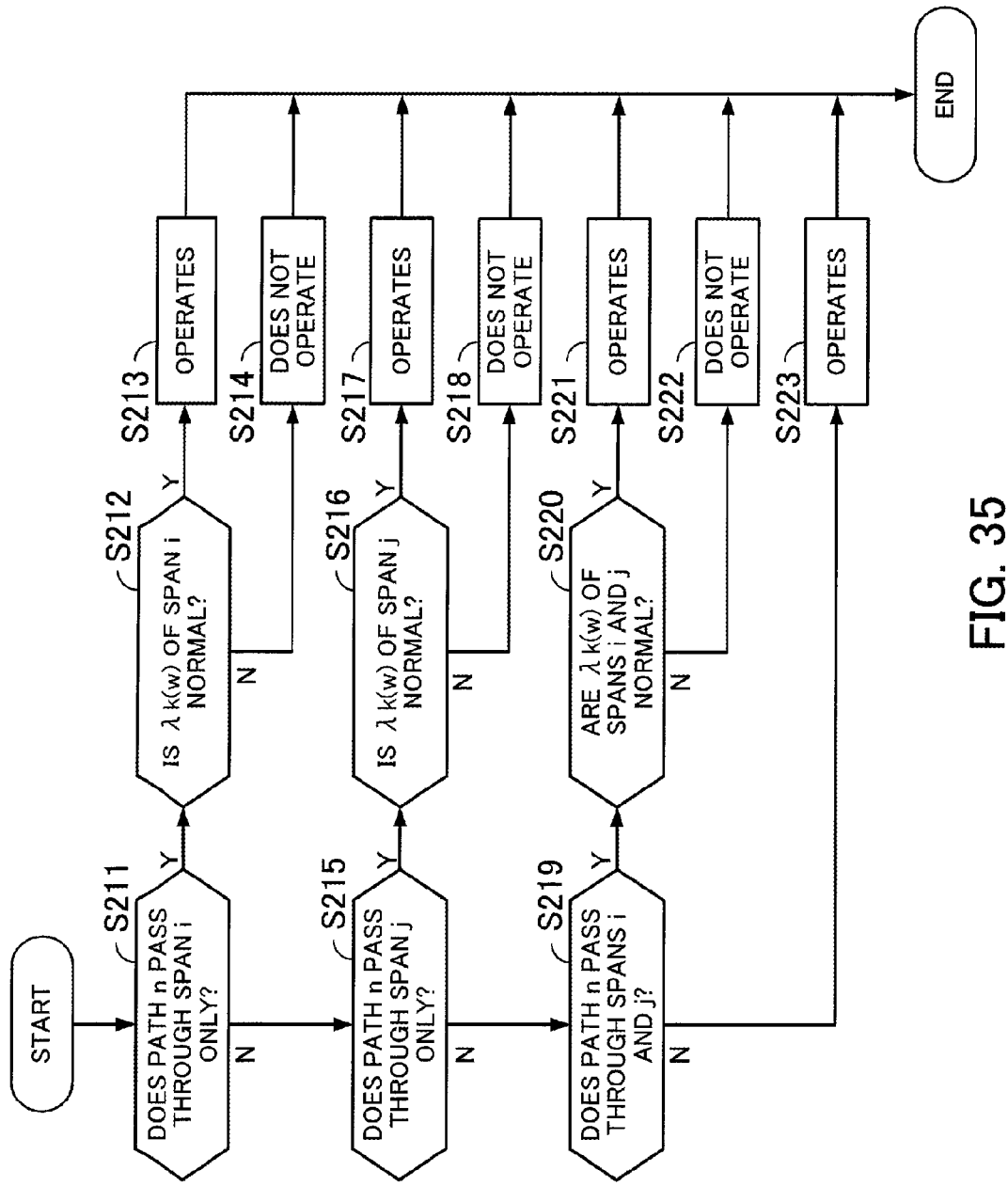
FIG. 35 is a flowchart for determining whether a path normally operates without the span switching i and j.

FIG. 35 is a flowchart for determining whether a path normally operates without the span switching i and j. The controller executes the following steps to determine whether a path n normally operates without the span switching i and j.

(Step S211) The controller determines whether the path n passes through the span i only. If so, the controller advances to step S212. If not, the controller proceeds to step S215.

(Step S212) The controller determines whether the wavelength channel λk(w) of the span i is normal. If so, the controller advances to step S213. If not, the controller proceeds to step S214.

(Step S213) The controller determines that the path n normally operates.

(Step S214) The controller determines that the path n does not normally operate.

(Step S215) The controller determines whether the path n passes through the span j only. If so, the controller advances to step S216. If not, the controller proceeds to step S219.

(Step S216) The controller determines whether the wavelength channel λk(w) of the span j is normal. If so, the controller advances to step S217. If not, the controller proceeds to step S218.

(Step S217) The controller determines that the path n normally operates.

(Step S218) The controller determines that the path n does not normally operate.

(Step S219) The controller determines whether the path n passes through the spans i and j. If so, the controller advances to step S220. If not, the controller proceeds to step S223.

(Step S220) The controller determines whether the wavelength channels λk(w) of the spans i and j are normal. If so, the controller advances to step S221. If not, the controller proceeds to step S222.

(Step S221) The controller determines that the path n normally operates.

(Step S222) The controller determines that the path n does not normally operate.

(Step S223) The controller determines that the path n normally operates.

As described above, the nodes are able to keep using as many operating paths as possible in the 4-fiber BLSR.

Fourth Embodiment

A fourth embodiment will be described in detail below with reference to the drawings. In the fourth embodiment, priority information is added to a path information table. In the fourth embodiment, nodes includes the same functional blocks as those of FIG. 3, but the path information table 32 and the controller 31 are provided with different functions.

FIG. 36 illustrates an example of a path information table according to the fourth embodiment. The path information table 61 illustrated in FIG. 36 additionally has a column for priority, as compared to the path information table 32 illustrated in FIG. 8.

The priority column contains a value indicating the priority of a path. For example, the priority column contains a greater value for a path which transmits a more important signal. Referring to the example of FIG. 36, a path 3 has the highest priority, a path 1 has the second highest priority, and then a path 2 has the third highest priority.

The controller of a node counts the number of operating paths, with taking the priority into consideration. For example, when a certain path operates in a certain switching pattern, the controller adds not 1 but a priority value to a variable 'operating count'. This enables the node to perform switching so as to keep using paths with high priority.

As described above, the controller of a node counts the number of operating paths, with taking the priority of paths into consideration. This technique makes it possible to perform switching so as to keep using paths with high priority.

The fourth embodiment is also applicable to the third embodiment. In other word, the fourth embodiment is applicable to a 4-fiber BLSR network as well.

Fifth Embodiment

A fifth embodiment will be described in detail below with reference to the drawings. In the fifth embodiment, a node is designed to use both fault information detected by its own node and fault information transmitted from a counterpart node in order to detect a fault occurring in a corresponding span, store fault information in APS information, and transmit the APS information. Nodes according to the fifth embodiment have the same functional blocks as those of FIG. 3, but a controller has partially different functions.

Figure 37:
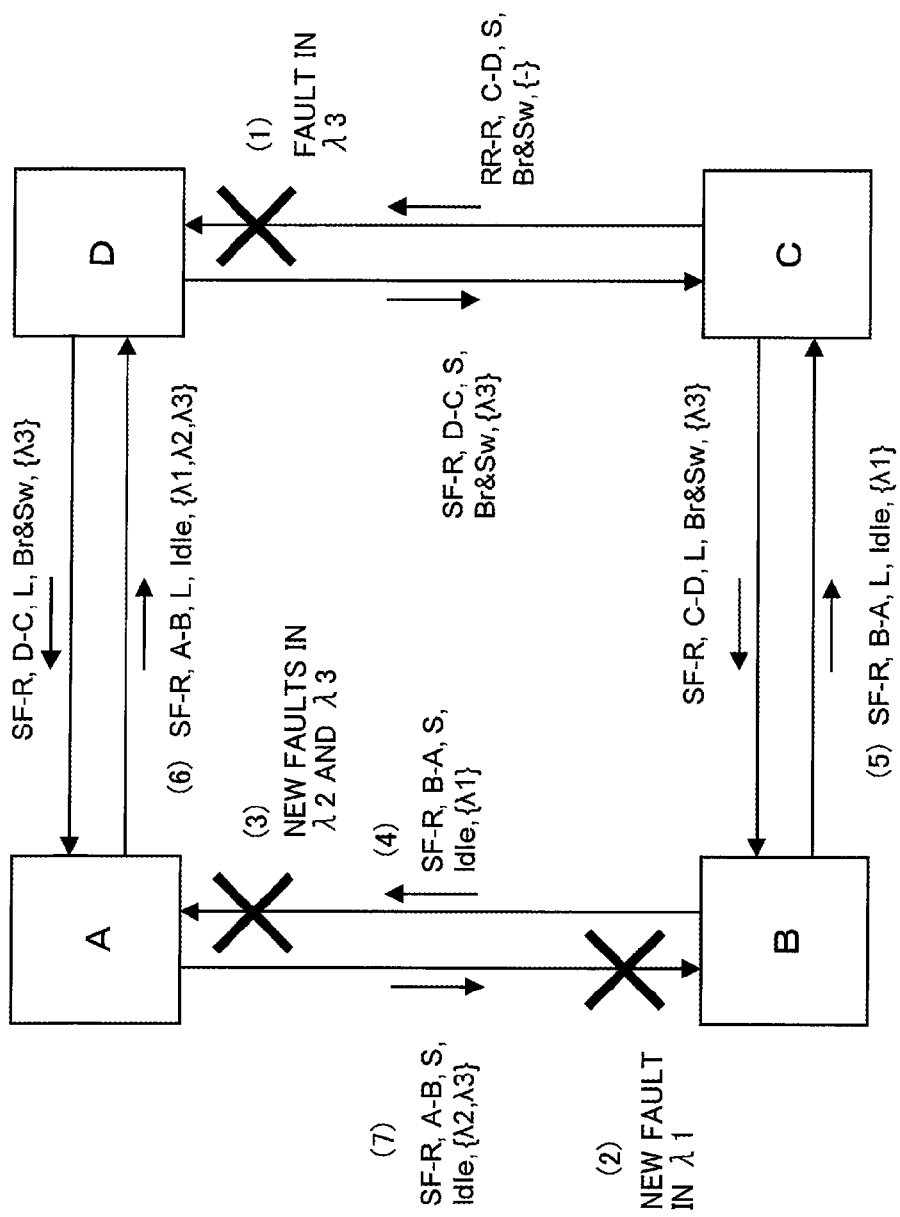
FIG. 37 illustrates operations of nodes according to a fifth embodiment (part 1)

FIG. 37 illustrates operations of nodes according to the fifth embodiment (part 1). FIG. 37 illustrates nodes A to D. In FIG. 37, assume that wavelength channels λ1 to λ3 are grouped, and the nodes A to D transfer APS information through the wavelength channel λ1. Hereinafter, the wavelength channel λ1 for transferring APS information may be referred to as a representative wavelength channel. In addition, assume that in the state of FIG. 21, a fault (2) has occurred in the wavelength channel λ1 in the direction from the node A to the node B, and faults (3) have occurred in the wavelength channels λ2 and λ3 in the direction from the node B to the node A (x-marks illustrated in FIG. 37).

Each of the nodes A and B transmits information on the fault wavelength channel detected by the own node in a short direction (4, 7).

Assume that, based on the APS information transmitted in the short direction and the fault information detected by the own node, each of the node A and B then transfers fault information in a long direction. The node A performs an OR operation on the faults (3) in the wavelength channels λ2 and λ3 detected by its own node and the fault (4) in the wavelength channel λ1 confirmed from the transferred APS information, to recognize the faults in the wavelength channels λ1 to λ3 in any of the directions between the nodes A and B, thereby making it possible to transfer the APS information.

However, the fault occurring in the representative wavelength channel prevents the node B from receiving the APS information (7), and as a result, the node B recognizes only the fault occurring in the wavelength channel λ1. Therefore, the node B is unable to appropriately detect the number of operating paths.

Suppose, for example, that the node B notifies the node C of only the fault occurring in the wavelength channel λ1.

The node C receives APS information from the node B (5). Since recognizing that a fault has occurred only in the wavelength channel λ1 between the nodes A and B, the node C is unable to appropriately detect the number of operating paths.

Further, the nodes A and D recognize different fault information from the nodes B and C; therefore, may make different determination in the number of operating paths and switching operations.

Figure 38:
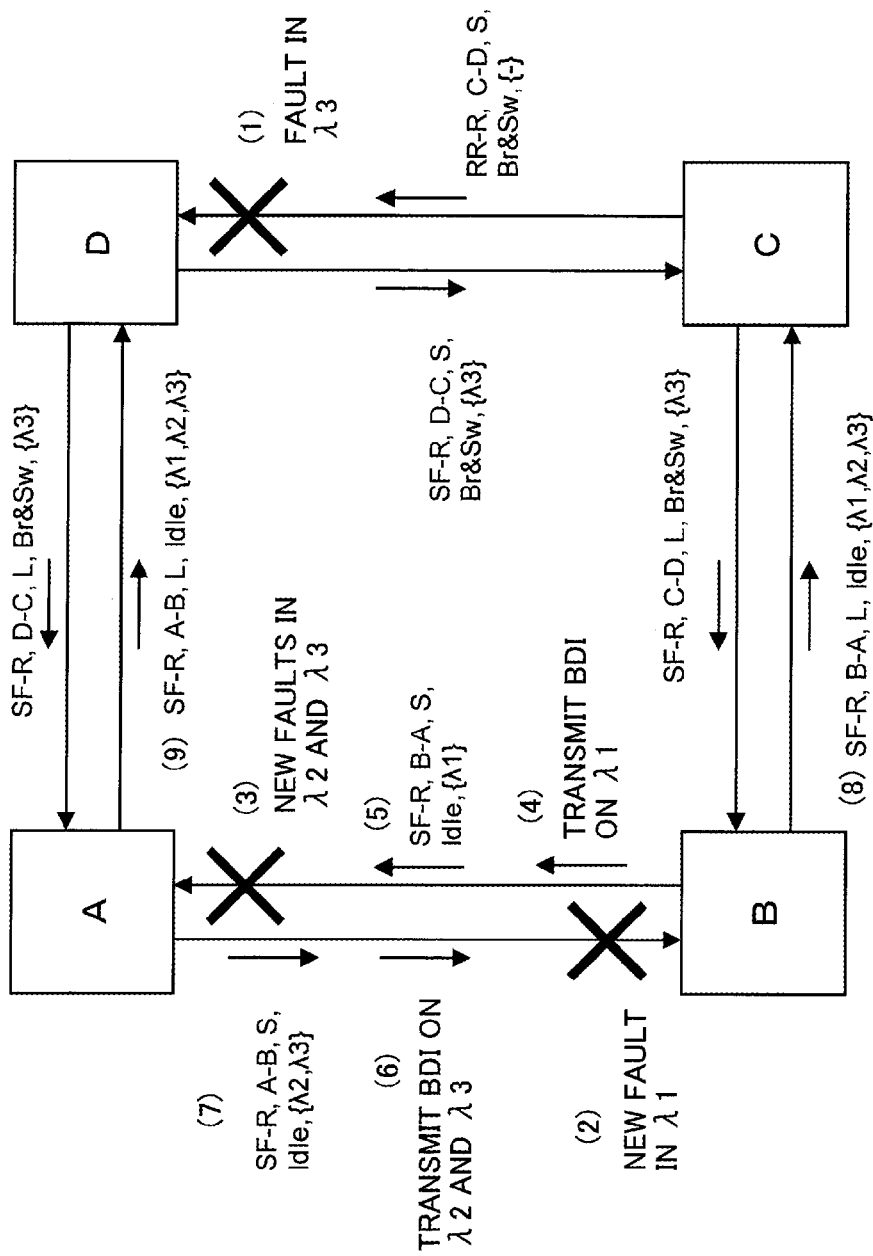
FIG. 38 illustrates operations of nodes according to a fifth embodiment (part 2)

FIG. 38 illustrates operations of nodes according to the fifth embodiment (part 2). To solve the above-described problem, the nodes A to D transfer APS information in consideration of Backward Defect Indication (BDI).

The node B detects a fault in the wavelength channel λ1 (2) and transmits BDI on the wavelength channel λ1 (4). For example, the node B sets to 1 a BDI bit of an overhead of HO ODU passing through the wavelength channel λ1.

The node A detects faults in the wavelength channels λ2 and λ3 and transmits BDI on the wavelength channels λ2 and λ3 (6). Since transmitted with HO ODU passing through the wavelength channels λ2 and λ3, the BDI is not related to the fault in the wavelength channel λ1 being a representative wavelength channel. Therefore, the BDI of the node A reaches the node B.

The node B performs an OR operation on the fault in the wavelength channel λ1 detected by its own node (2) and the BDI transmitted from the node A (6), and transmits the result to the node C (8). In a similar fashion, the node A also performs an OR operation on the faults in the wavelength channels λ2 and λ3 detected by its own node (3) and the BDI transmitted from the node B (4), and transmits the result to the node D (9). Note that, for example, if the node A is able to receive APS information, the node A may perform an OR operation on the faults in the wavelength channels λ2 and λ3 detected by its own node (3) and the APS information (5).

The nodes C and D receive appropriate fault information on a fault occurring between the nodes A and B, and make an appropriate determination about the number of operating paths and switching operations.

Referring back to the example of FIG. 26 (an example where a fault occurs in HO ODU of the wavelength channel λ1 indicated in the arrow A1), as indicated in the arrow A2, the node 53 sets to 1 the BDI in an overhead of the HO ODU path in the reverse direction, and transmits the BDI on the node 54.

Figure 39:
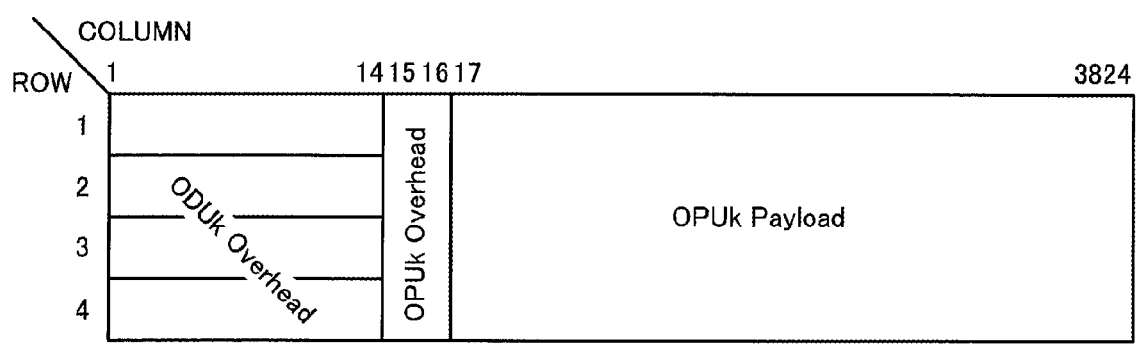
FIG. 39 illustrates a frame configuration example of an ODU.

FIG. 39 illustrates a frame configuration example of an ODU. As illustrated in FIG. 39, an ODU frame is represented in 4 rows and 3824 columns. A row corresponds to a byte. Accordingly, the ODU frame is able to store information of 3824×4 bytes.

There is a field referred to as a Path Monitoring (PM) in the third row and the tenth to twelfth columns of the ODU frame illustrated in FIG. 39 (PM is not illustrated). A BDI field is in the fifth bit of the third byte of the PM. The APS information is transferred by using APS/PCC (Protection Communication Control channel) bytes in the fourth row and the fifth to eighth columns of the ODU frame.

As described above, even if a fault occurs in a representative wavelength channel through which APS information is transferred, a controller notifies other controllers of fault information by using BDI. This makes it possible to appropriately determine the number of operating paths and perform a switching operation.

The disclosed optical transmission apparatus makes it possible to keep using as many operating paths as possible.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An optical transmission method for transmitting an optical signal, comprising:
    storing, in a path information table, paths set in a network and wavelength channel information on the paths; and
    searching, by a controller, for an apparatus which performs route switching of paths using a plurality of grouped wavelength channels, based on fault information on the network detected by an optical transmission apparatus, fault information on the network detected by another optical transmission apparatus, and the paths and wavelength channel information on the paths stored in the path information table,
    wherein the controller performs the route switching of the paths upon determining that a number of operating paths is maximized by performing the route switching of the paths in the network and faults occur in one or more wavelength channels in a group;
    and wherein the controller stops performing the route switching of the paths upon determining that a number of operating paths is not maximized by performing the route switching of the paths in the network, even though faults occur in one or more wavelength channels in the group.

2. The optical transmission method according to claim 1, wherein the controller counts the number of operating paths in the group, for each of a case where ring switching is performed in a first span to which the optical transmission apparatus is connected, a case where ring switching is performed in a second span to which the optical transmission apparatus is not connected, a case where ring switching is performed in the first and second spans, and a case where ring switching is not performed in the first and second spans.

3. The optical transmission method according to claim 2, wherein, upon detecting that some of the cases result in a same number of operating paths, the controller applies a priority order of: the case where the ring switching is not performed, the case where the ring switching is performed in the first span or the case where the ring switching is performed in the second span, and the case where the ring switching is performed in the first and second spans.

4. The optical transmission method according to claim 3, wherein, upon detecting that the case where the ring switching is performed in the first span and the case where the ring switching is performed in the second span result in a same number of operating paths, the controller applies a priority based on identification numbers of apparatus connected to both ends of the first span and identification number of apparatus connected to both ends of the second spans.

5. The optical transmission method according to claim 2, wherein, in a ring network using four fibers in each span, the controller further counts the number of operating paths in the group, for each of a case where span switching is performed in the first span, a case where span switching is performed in the second span, a case where span switching is performed in the first and second spans, and a case where span switching is not performed in the first and second spans.

6. The optical transmission method according to claim 5, wherein, upon detecting that some of the cases result in a same number of operating paths, the controller applies a priority order of: a case where the span switching and ring switching are not performed, the case where the span switching is performed in the first span or the case where the span switching is performed in the second span, the case where the span switching is performed in the first and second spans, the case where the ring switching is performed in the first span or the case where the ring switching is performed in the second span, and the case where the ring switching is performed in the first and second spans.

7. The optical transmission method according to claim 6, wherein, upon detecting that the case where the span switching is performed in the first span and the case where the span switching is performed in the second span result in a same number of operating paths, or upon detecting that the case where the ring switching is performed in the first span and the case where the ring switching is performed in the second span result in a same number of operating paths, the controller applies a priority based on identification numbers of apparatus connected to both ends of the first span and identification number of apparatus connected to both ends of the second spans.

8. The optical transmission method according to claim 1, wherein:
    the path information table stores priority information corresponding to each path; and
    the controller calculates the number of operating paths in consideration of the priority information.

9. The optical transmission method according to claim 1, wherein:
    the controller determines a fault in a span based on the fault information detected by the optical transmission apparatus and fault information transmitted from a counterpart optical transmission apparatus that is a counterpart of the optical transmission apparatus; and
    the controller stores a result of the determination in automatic protection switching information, and transfers the automatic protection switching information to another optical transmission apparatus.

10. The optical transmission method according to claim 1, wherein upon determining that the route switching of the paths does not need to be performed in the optical transmission apparatus currently performing the route switching of the paths, the controller disables the route switching.

11. The optical transmission method according to claim 10, wherein upon determining that the route switching of the paths needs to be performed in another optical transmission apparatus, the controller disables the route switching and then performs a pass-through process.

12. The optical transmission method according to claim 10, wherein upon determining that the route switching of the paths needs to be performed in the optical transmission apparatus and that the route switching of the paths does not need to be performed in said another optical transmission apparatus currently performing the route switching of the paths, the controller refers to a status of the received automatic protection switching information to confirm that the route switching performed by said another optical transmission apparatus is disabled, and then performs the route switching of the paths in the optical transmission apparatus.

\* \* \* \* \*